United States Patent
Bremeier et al.

(10) Patent No.: US 11,156,220 B2
(45) Date of Patent: Oct. 26, 2021

(54) COMPRESSOR FOR COMPRESSED AIR SUPPLY AND PNEUMATIC SYSTEMS

(71) Applicant: WABCO GmbH, Hannover (DE)

(72) Inventors: Ralf Bremeier, Kalletal (DE); Pierre Celestin Koumenda, Hannover (DE); Jorg Meier, Hessisch Oldendorf (DE); Robert Sohn, Hannover (DE); Uwe Stabenow, Laatzen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 194 days.

(21) Appl. No.: 14/649,640

(22) PCT Filed: Oct. 31, 2013

(86) PCT No.: PCT/EP2013/003270
§ 371 (c)(1),
(2) Date: Jun. 4, 2015

(87) PCT Pub. No.: WO2014/090355
PCT Pub. Date: Jun. 19, 2014

(65) Prior Publication Data
US 2015/0345490 A1    Dec. 3, 2015

(30) Foreign Application Priority Data

Dec. 13, 2012    (DE) .................. 10 2012 024 400.2

(51) Int. Cl.
*F04B 49/06*    (2006.01)
*F04D 27/00*    (2006.01)
*H02P 1/24*    (2006.01)

(52) U.S. Cl.
CPC ............ *F04B 49/065* (2013.01); *F04B 49/06* (2013.01); *F04D 27/00* (2013.01); *H02P 1/24* (2013.01)

(58) Field of Classification Search
None
See application file for complete search history.

(56) References Cited

U.S. PATENT DOCUMENTS 3,840,799 A * 10/1974 Macko ............... H02M 5/4505
318/722
3,891,355 A * 6/1975 Hecht .................. F04D 25/082
417/371

(Continued)

FOREIGN PATENT DOCUMENTS

CN    101005267 A    7/2007
DE    27 58 309 C2    7/1979

(Continued)

OTHER PUBLICATIONS

Reinhold, A; Machine Translation of EP1039623A2, (Translation, Sep. 2020), Translation obtained from https://translationportal.epo.org/ (Year: 2020).*

*Primary Examiner* — Peter J Bertheaud
*Assistant Examiner* — Geoffrey S Lee
(74) *Attorney, Agent, or Firm* — Leydig, Voit & Mayer, Ltd.

(57) ABSTRACT

A compressor for producing compressed air, in particular for a compressed air supply system of a vehicle, includes an electric motor in the form of a brushed direct current electric motor. The compressor has at least one first and one second compressor step, which can be driven by the electric motor. The motor can be controlled by means of an electronic control module of a control device by limiting an operational flow of the motor.

30 Claims, 11 Drawing Sheets

(56) References Cited

U.S. PATENT DOCUMENTS

| | | | | |
|---|---|---|---|---|
| 4,074,179 A * | 2/1978 | Kuo | H02P 8/12 | 318/696 |
| 4,628,235 A * | 12/1986 | Goings | H02P 7/06 | 318/430 |
| 4,638,226 A * | 1/1987 | Damiano | H02P 25/14 | 318/246 |
| 4,763,347 A * | 8/1988 | Erdman | H02P 6/182 | 318/400.21 |
| 4,873,453 A * | 10/1989 | Schmerda | H02H 7/0833 | 307/130 |
| 5,350,992 A * | 9/1994 | Colter | H02M 7/48 | 318/805 |
| 5,416,885 A * | 5/1995 | Sakoh | H02P 7/2885 | 318/650 |
| 5,604,672 A * | 2/1997 | Yoshida | H02M 7/5395 | 318/811 |
| 5,663,627 A * | 9/1997 | Ogawa | F24F 11/0009 | 318/803 |
| 5,672,944 A * | 9/1997 | Gokhale | H02P 6/10 | 318/400.23 |
| 5,844,440 A * | 12/1998 | Lenk | G05F 1/573 | 327/322 |
| 5,937,622 A * | 8/1999 | Carrier | A01D 34/006 | 56/10.2 R |
| 6,055,359 A * | 4/2000 | Gillett | H02P 7/29 | 318/432 |
| 6,064,163 A * | 5/2000 | Yoshida | H02P 1/24 | 318/400.34 |
| 6,456,028 B2 * | 9/2002 | Aoki | H02P 7/2805 | 318/400.33 |
| 6,801,009 B2 * | 10/2004 | Makaran | H02P 29/02 | 318/599 |
| 7,755,318 B1 * | 7/2010 | Panosh | F04B 49/065 | 318/778 |
| 8,228,648 B2 * | 7/2012 | Jayanth | G01R 19/10 | 307/85 |
| 8,384,325 B2 * | 2/2013 | Mishima | H02P 1/18 | 318/400.09 |
| 8,674,650 B1 * | 3/2014 | Rabinovich | H02P 1/32 | 318/376 |
| 2001/0024996 A1 * | 9/2001 | Sugano | B60K 6/387 | 477/2 |
| 2003/0108430 A1 * | 6/2003 | Yoshida | F04B 35/045 | 417/44.11 |
| 2003/0196824 A1 * | 10/2003 | Gass | B25B 23/147 | 173/131 |
| 2003/0222617 A1 * | 12/2003 | Nakai | F16H 61/32 | 318/701 |
| 2004/0232864 A1 * | 11/2004 | Sunaga | H02P 7/29 | 318/434 |
| 2005/0068001 A1 | 3/2005 | Skaug et al. | | |
| 2005/0231146 A1 * | 10/2005 | De Frutos | H02P 7/06 | 318/400.23 |
| 2007/0070561 A1 * | 3/2007 | Pedersen | H02H 7/0816 | 361/31 |
| 2008/0100248 A1 * | 5/2008 | Filippenko | H02P 6/182 | 318/466 |
| 2008/0116898 A1 * | 5/2008 | Washington | H02P 7/00 | 324/521 |
| 2008/0150471 A1 * | 6/2008 | Unsworth | H02P 1/24 | 318/771 |
| 2008/0298784 A1 * | 12/2008 | Kastner | H02P 7/0094 | 388/811 |
| 2009/0032158 A1 * | 2/2009 | Rudolf | B60C 23/003 | 152/415 |
| 2010/0033064 A1 * | 2/2010 | Tanaka | G01B 7/30 | 310/67 R |
| 2010/0111709 A1 * | 5/2010 | Jayanth | F04C 23/008 | 417/44.11 |
| 2010/0141194 A1 * | 6/2010 | Koehl | F04D 15/0088 | 318/434 |
| 2011/0262112 A1 * | 10/2011 | Tanaka | G01P 3/48 | 388/811 |
| 2012/0193845 A1 * | 8/2012 | Yamanaka | B60G 11/26 | 267/64.28 |
| 2013/0342147 A1 * | 12/2013 | Bidlingmeyer | F04B 49/065 | 318/430 |
| 2016/0061207 A1 * | 3/2016 | Penn, II | F04B 35/04 | 417/44.1 |
| 2016/0173008 A1 * | 6/2016 | Waltuch | H02P 1/24 | 318/484 |
| 2016/0001624 A1 * | 7/2016 | Meissner et al. | B60G 17/04 | |

FOREIGN PATENT DOCUMENTS

| | | | |
|---|---|---|---|
| DE | 1039623 A2 * | 11/1999 | H02P 1/18 |
| DE | 10 2010 054 710 A1 | 6/2012 | |
| DE | 10 2012 201 253 A1 | 8/2012 | |
| EP | 2 293 426 A1 | 3/2011 | |
| JP | 115791 | 11/1996 | |
| WO | WO 2010/045993 A1 | 4/2010 | |
| WO | WO 2012/105264 A1 | 8/2012 | |

* cited by examiner

COMPRESSOR FOR COMPRESSED AIR SUPPLY AND PNEUMATIC SYSTEMS

FIELD OF THE INVENTION

The present invention generally relates to compressors and vehicle compressed air supply and pneumatic systems.

BACKGROUND OF THE INVENTION

A compressor of the general type under consideration has proven valuable for a large number of applications, but, in particular, for producing compressed air for a compressed air supply installation of a vehicle. In this context, a compressor unit has an electric motor in the form of a brushed DC electric motor which can drive the compressor. The brushed DC electric motor ("BDC motor") has proven valuable, for various reasons, compared to a brushless DC motor ("BLDC motor"), in particular for the abovementioned application of a compressed air supply installation of a vehicle.

A BLDC motor is a DC motor in which the mechanical commutator, which is provided with brushes in the case of brushed DC electric motors for reversing the current, is replaced by an electrical circuit. BLDC motors are suitable for driving machines that are configured for a comparatively low load such as fans, drives in disc drives, compressor units, video recorders or model aircraft and the like, but have various disadvantages in automotive applications with relatively high load requirements. A brushed DC motor is basically the more favorable variant, at any rate in applications with relatively high requirements in terms of reliability and load compatibility.

On the other hand, a compressor unit that is usually actuated by means of a compressor unit relay and is driven by means of a DC brushed motor has various disadvantages, as a result of its high power drain, in the case of switching on and in the case of shutting down, under certain circumstances also during operation under different load conditions.

In order to at least begin to overcome such disadvantages, for example, Applicant's WO 2010/045993 discloses an electric motor for driving a compressor unit of an air supply unit of a vehicle, wherein the electric motor has at least one semiconductor switch for actuating the motor. The semiconductor switch, and therefore the electric motor, are actuated by a control device with a pulse width-modulated voltage. The rotational speed of the electric motor can be controlled by means of the pulse/pause ratio of this voltage. As a result, for example, a soft start of the electric motor is possible. A sensor output of the semiconductor switch is connected to a control device via a measuring line. The sensor output serves to output a power signal that is proportional to the current flowing through the semiconductor switch and therefore through the electric motor. The rotational speed of the electric motor and the pressure produced by the compressor unit are determined in the control device on the basis of the power signal. In this case, a semiconductor switch is integrated into a brush bridge of the electric motor.

The foregoing is advantageous compared to soft start circuits, which are usually based on thyristors, even if the soft start circuits are comparatively costly, embodied, for example, with a timer element based on a control transistor, as disclosed in DE 2 758 309 C2 for a universal motor.

Nevertheless, there remains room to improve the operation of a compressor for producing compressed air, in particular with respect to the limitation of an operating current of the electric motor, and above and beyond the basically positive approach in Applicant's WO 2010/045993 A1.

SUMMARY OF THE INVENTION

Generally speaking, it is an object of the present invention to provide a device and a method for supplying compressed air to a vehicle, in which the control provided by means of an electronic control device with the limitation of an operating current of the electric motor is improved. The control is in particular to be configured generally to improve the mode of operation of a compressor, preferably to implement a soft start, a shutdown mode and/or a normal mode. Rotational speed control of the compressor unit is to be preferably possible, in particular in a normal mode.

Inventive embodiments are based on the idea that the electric motor should be controlled by means of an electronic control module while limiting an operating current of the motor. In this context, the electric motor is preferably a brushed DC electric motor (BDC motor). This is particularly advantageous for a compressed air supply installation of a vehicle; especially, for utilizing the compressor to produce compressed air in a compressed air feed of the compressed air supply installation. It will be appreciated that inventive embodiments leverage the operation of a brushed DC electric motor (BDC motor), while avoiding disadvantages associated with relay operation, as are described, for example, in Applicant's WO 2010/045993 A1.

Furthermore, the electronic control module—denoted as a CSS controller (CSS, compressor soft start) which is suitable for a soft start—can be improved. According to inventive embodiments, the electronic control module (CSS control module) has a control assembly, such as a microcontroller or similar assembly provided with logic, and has an executable program module.

For the chronologically transient operation of the brushed DC electric motor more than a time-independent operating current limitation can be provided. An operating current limitation can be predefined as a function of the time in a variable fashion, in particular at least a first and a second threshold current that are different from one another can be predefined. On this basis, not only is predefinition of a maximum threshold current permitted, but, furthermore, predefinition of a gradient for the operating current, by means of the chronologically variable predefinition of threshold currents that limit the operating current, is also permitted.

According to embodiments of the present invention, building on a brushed DC electric motor (BDC motor) permits the motor to be limited with respect to the operating current in an improved fashion while maintaining the superiority and the advantages of the motor. Not only is absolute limitation of the operating current possible, but also gradient limitation of the operating current is advantageously possible.

In one embodiment, a compressor unit relay is replaced by a semiconductor switch that is actuated by means of a microcontroller. When there is a request to switch on the compressor unit, the permissible power drain of the compressor unit is limited by means of a program module stored in the microcontroller. The permissible power for a switch-on request can be changed chronologically such that both the start current peak and the start current gradient (dI/dt) are influenced. This is done by rapid actuation of the semiconductor switch.

By means of the program module stored in the microcontroller it is also possible to limit the permissible shutdown current gradient of the compressor unit when there is a request to shut down the compressor unit. This can also be implemented by rapid actuation of the semiconductor switch.

By means of the program module stored in the microcontroller it is also possible to regulate the power drain of the compressor unit, even after the end of the switch-on process (that is, when the compressor unit is running) by means of PWM actuation with a variable pulse/pause ratio or with a variable frequency, such that the load-dependent, in particular pressure-dependent, changes in rotational speed can be minimized.

According to an embodiment, a control module is configured to predefine in a chronologically variable fashion a threshold current that limits the operating current. The program module can be designed to predefine a threshold current-limiting function of the threshold current as a function of the time in order to limit the operating current. As a result, it is possible to keep the operating current below an envelope in a precisely targeted fashion; the envelope is advantageously predefined essentially by the threshold current-limiting function. As a result, the operation of the electric motor can generally be effected in a further improved fashion, in particular while limiting an operating energy supply such as an operating current and/or an operating voltage.

In one embodiment, the control assembly is designed to interrupt the operation, in particular the operating energy supply, i.e., an operating current and/or an operating voltage, of the electric motor, briefly in a repeated fashion. For this purpose, an operating voltage of the electric motor can be interrupted. The operation, in particular of the operating energy supply, i.e., of an operating current and/or of an operating voltage, is preferably interrupted in the event of the operating current reaching the threshold current of the threshold current-limiting function. For example, a permissible operating current of the electric motor can be increased or reduced in order to operate the compressor unit from a starting value to a final value according to a predefined function of the time.

A start current peak and/or a phase length of an assigned start time period and/or shutdown time period and/or a start current gradient can be advantageously influenced selectively; this applies additionally or alternatively to a shutdown current peak and a shutdown current gradient. In one embodiment, a starting capability and/or shutdown capability of the compressor unit is not reduced, or not reduced significantly, despite the operating current limitation. This is due essentially to the threshold current, which limits the operating current, being predefined in a chronologically variable fashion. With respect to an improved shutdown behavior, an acoustically unnoticeable compressor unit run-out can be achieved.

In one embodiment, the electronic control module also has a sampling unit by means of which an actual operating current of the electric motor can be signaled with a predefinable sampling rate. A sampling rate is preferably in the range between 100 Hz and 50 000 Hz, if appropriate up to 100 000 Hz. Preferably, the sampling rate is between 20 000 Hz and 30 000 Hz, for example 28 000 Hz at a sampling rate of 35 is. The higher a sampling rate, the tighter and more selectively can a start current and/or shutdown current be selectively controlled during the operation of the electric motor with respect to peak behavior and/or gradient behavior. In particular, a peak limitation can be produced by controlling dwell times in start time periods and/or shutdown time periods, for example the $AnT\_i$ values or $AusT\_i$ values ($i=1 \ldots n$) of phase lengths, where n is a natural number 1, 2, 3, 4 etc., which is preferably between 4 and 10 but can also be above that. These phase lengths can also define a gradient behavior of the start current and/or shutdown current.

Additionally or alternatively, a comparison unit by means of which a signaled actual operating current can be compared with a threshold current as a function of the time can be provided. Overall, a start current peak and/or shutdown current peak and/or start current gradient behavior and/or shutdown current gradient behavior can be limited by comparatively rapid actuation, in particular with a comparatively high sampling rate of the electronic control module.

In one embodiment, a threshold current-limiting function can be predefined with at least one maximum value and/or one gradient of the threshold current. As a result, a maximum value and/or a gradient of the operating current can therefore be predefined. For example, a threshold current-limiting function in the form of a linear function of time can be used. For such threshold current-limiting functions, and for other threshold current-limiting functions, it is possible to predefine a gradient (a rising gradient and/or falling gradient) for a specific dwell time of a time phase, in addition to an amplitude value in addition to the gradient. This can also apply to functions of relatively high degree, for example any desired-polynomial or an exponential function.

The electronic control module can be designed to control a soft start (CSS, compressor soft start), to permit an unlimited start operating current in a chronologically limited first time phase. This ensures a safe compressor unit start. In a first chronologically limited time phase, there is therefore no direct limitation of an operating current; indirect limitation occurs on the basis of the chronologically limited duration of the first time phase.

Additionally or alternatively, a start operating current that is limited in a chronologically variable fashion can be predefined in a chronologically limited second time phase. The desired limitation of the operating current of the electric motor for driving the compressor unit can be effected by means of the second chronologically limited time phase. The operation is determined and, if appropriate, interrupted, to sustainably improve the tight and targeted direction of the operating current in a limited fashion to a variably predefinable peak and/or gradient (positive gradient).

The program module can predefine, in a start phase, preferably in a chronologically limited second time phase, at least a first start threshold current-limiting function for a first start time period, and a second start threshold current-limiting function for a second start time period, for a start operating current. Further start time periods, preferably four in number, can be predefined in a start phase for a start operating current depending on need. It is therefore possible, for example, to predefine an incrementally rising threshold current in a start phase, with the result that, in the start phase, the operating current is increased gradually toward a start gradient that is basically predefined as a result. The positive gradient of a first start threshold current-limiting function is preferably larger in absolute terms than the positive gradient of a second start threshold current-limiting function.

A changeover from a start phase to a load phase advantageously takes place independently of an operating current of the compressor unit. This also ensures the full functionality of the compressor unit after a certain time with respect to the components connected thereto, in particular a compressed air supply installation of a vehicle.

The start phase advantageously comprises the soft start of the compressor unit. The load phase is to be understood, in particular, as a phase that comprises only a current-unlimited run of the compressor unit.

A changeover from a start phase to a load phase is preferably independent of a sampling rate in a last time phase of a soft start, since the dwell times during the start phase are dimensioned such that after a certain dwell time it is possible to assume an uncompromised transition to the load phase. In this respect, with a switch-on request of the compressor unit, a chronologically limited scope is provided for a start phase, after which it can be assumed that the compressor unit can satisfy the power request subsequent to the switch-on request.

Furthermore, the electronic control module is preferably designed to control a soft shutdown. A chronologically limited time phase of a shutdown operating current that is limited in a chronologically variable fashion can preferably be predefined. In particular, a shutdown phase is present following a chronologically determined duration of a shutdown request.

With respect to the soft shutdown, the program module can predefine for the shutdown operating current at least a first shutdown threshold current-limiting function for a first shutdown time period and a second shutdown threshold current-limiting function for a second shutdown time period. Like a prescribed preferred soft start, a number of i=1 . . . n time phases can be predefined, wherein n is a natural number. In particular, more than two time phases, preferably a number from four to ten time phases, can be predefined, with the predefinition of a respective dwell time and gradient of a threshold current. For example, nine time phases each of a 25 ms duration of a shutdown time period can be predefined.

A gradient value can advantageously be predefined from the absolute value in the shutdown phase. The predefinition of a gradient of the shutdown current is preferably sufficient for a soft shutdown behavior; with restriction, a soft shutdown behavior can take place without predefinition of an amplitude; preferably only with the predefinition of a gradient. According to one embodiment, a shutdown phase in which a decrementally falling operating current is implemented by correspondingly interrupting the operation, i.e., an energy supply such as a current or a voltage, of the electric motor, can advantageously be implemented by means of the soft shutdown. This follows a predefined shutdown gradient for the threshold current following.

According to another embodiment, during the feeding of air, a reduction, advantageously compensation, of a dependence of a rotational speed of a compressor unit on the opposing pressure is largely eliminated, and at any rate reduced. In another embodiment, the characteristic pressure/power drain curve can be calibrated in order to minimize the effects of tolerances on the regulation of the rotational speed.

With a rising opposing pressure, a power drain of the compressor unit rises. A rotational speed of a compressor unit is approximately proportional to the supply voltage thereof. In particular, by means of a current-dependent PWM characteristic curve for controlling a supply voltage it is possible to regulate the rotational speed of the compressor unit with respect to the power drain of the compressor unit in a preferred fashion.

In one embodiment, the electronic control module has a regulating unit designed to regulate an operating current of the electric motor with predefinition of a threshold current as a SETPOINT current. Additionally or alternatively, the electronic control module has a regulating unit designed to regulate a rotational speed of the electric motor with predefinition of a rotational speed upper limit or a variable correlating thereto, e.g., a current and/or a voltage for the operation, which can be placed in relationship with the rotational speed. An example of this is discussed hereinafter with respect to FIG. 10.

Pressureless starting of a compressor unit regularly leads to a comparatively high rotational speed in the starting process; this advantageously also brings about desired prompt supply of a pneumatic system, which can be connected to a compressed air supply installation. However, a rotational speed of the compressor unit decreases comparatively quickly when the opposing pressure increases. This can lead to an acoustically highly noticeable operating behavior of the compressor unit. The comparatively high transient rotational speed dynamics of the compressor unit can be disadvantageous in the case of a two-stage compressor unit with respect to the acoustic external effect. In particular, for a two-stage compressor unit, inventive embodiments can advantageously predefine a rotational speed upper limit that is constant in certain areas as a function of the operating current. While accepting a relatively low volume flow of the compressed air that can be accepted in the start process, predominantly acoustic operating advantages can be achieved over the entire operating process.

According to one embodiment, the regulating unit is designed to limit a rotational speed variability of the electric motor as a function of the operating current over a PWM characteristic curve. The PWM characteristic curve can advantageously be predefined in the form of an effective voltage ramp as a function of the operating current. The PWM characteristic curve can be stored in this or in another form in the program module of the control module and/or the regulating unit.

The PWM characteristic curve advantageously has a lower effective voltage in the case of a low current and an upper effective voltage in the case of a high current, wherein the lower effective voltage is below the upper effective voltage. The rotational speed variability of the electric motor also advantageously has an upper rotational speed value in the case of a low current and a lower rotational speed value in the case of a high current, wherein the upper rotational speed value is above the lower rotational speed value. The PWM characteristic curve preferably extends in the opposite direction to the rotational speed variability; in particular, the PWM characteristic curve has the same positive gradient in absolute terms as the rotational speed variability, but a different sign. The rotational speed upper limit is constant in certain areas as a function of the operating current.

As a result, the rotational speed variability in the case of opposing pressure at the compressor unit can be compensated particularly well. For this purpose, after the end of a switch-on process, in particular after the start phase, PWM actuation with a variable pulse/pause ratio or with a variable frequency is preferably performed with the compressor unit running, such that pressure-dependent changes in rotational speed are minimized.

The control or regulation of the rotational speed by means of a PWM-controlled supply voltage uses a sensor signal of the compressor unit current. For example, in the case of a low rotational speed a level for a minimum voltage can be provided. In the case of a low rotational speed, a level for a maximum voltage can be provided. Even in the case of a high rotational speed, a level for a minimum voltage can be provided; and even in the case of a high rotational speed, a level for a maximum voltage can be provided.

The ripple of the current can be used to determine an actual rotational speed of the compressor unit. Preferably, the compressor has an analysis unit by means of which an ACTUAL rotational speed can be determined on the basis of a chronological profile of the operating current. The frequency of a plurality of periodic peaks of a current ripple can advantageously be determined, wherein the frequency is assigned to the ACTUAL rotational speed of the compressor unit and the ACTUAL rotational speed is used as an input value for a regulating unit of the control module, which regulating unit is designed to regulate a rotational speed of the electric motor.

For example, a changeover between compression phases and intake phases of the compressor unit can be assigned to a peak composed of a plurality of periodic peaks in the chronological operating current profile. Additionally or alternatively, a changeover of commutation of the electric motor can also be assigned to a peak composed of a plurality of periodic peaks in the chronological operating current profile.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention is discussed in greater detail below on the basis of exemplary embodiments illustrated in the appended drawings, in which.

Figure 1:
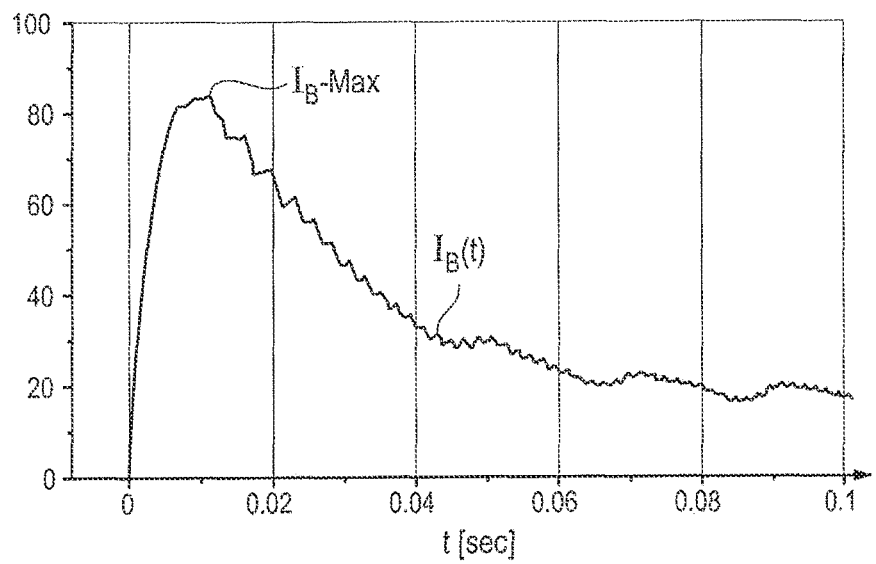
FIG. 1 shows an exemplary profile of a start current illustrating a start current characteristic without limitation of the current as a function of time for an operating current of a brushed DC electric motor during operation of a compressor unit of a compressor for producing compressed air for a compressed air supply installation of a vehicle according to an embodiment of the present invention.

LIST OF REFERENCE SYMBOLS 0 air feed
0.1 filter element
1 compressed air feed
2 compressed air port
3 venting port
100 air dryer
100' dryer module
140 drying container
180 air dryer
200 pneumatic main line
230 branch line
240 venting line 250 pneumatic control line
251 line section
260 venting line
261 branch port
300 valve arrangement
301 flange
301' air distribution module
310 directional control valve arrangement
310' valve housing module
311 non-return valve
312 venting valve
313 pressure limiter
314 piston
315 spring
320 solenoid valve, control valve
321 control line
322 coil
330 boost valve
330' boost valve housing module
331 first throttle
332 second throttle
400 compressor unit
400' compressor
401 first compressor stage
402 second compressor stage
500 electric motor
600 pneumatic line
601, 602, 603, 604 spring branch line
605 accumulator branch line
610 gallery
700 suspension device
710 spring mounts
720 attachment connections
900, 900' control device, regulating device
910 control module
911 control assembly
912 program module
913 memory
920 regulating module
921 first regulating unit
922 second regulating unit
930 analysis unit
923 third regulating unit
931, 932, 933 input modules
940 actuator system
1000 compressed air supply installation
1001 pneumatic system
1002 compressed air supply system
1010 valve block
1011, 1012, 1013, 1014 four bellows
1015 accumulator
111, 1112, 1113, 1114 solenoid valve
A1, A2 connection plane, connection side
AnP start phase
AnP1, AnP2 first and second time phases
AnP21, AnP22, AnP23, AnP24 start time periods
AnT1, AnT2, AnT3, AnT4 dwell times in the start time period
AnGF1 to AnGF4 start threshold current-limiting function GF
LaP load phase
AusP shutdown phase
AusP1, AusP2, AusP3, AusP4 shutdown time periods
AusT1, AusT2, AusT3, AusT4 dwell times in shutdown time periods
G housing arrangement
GF threshold current-limiting function
Grad1, Grad2, Grad3, Grad4 positive gradients
IB operating current
E(IB) envelope
IB-ACT actual value of the operating current
I-END final current
IS threshold current
IS-SETP ACTUAL value of the threshold current
I-START, I-END starting current, final current
I0, I1, I2, I3, I4 reference points
M compressor unit motor, electric motor
LaP load phase
nK rotational speed of the electric motor/compressor unit
nK-ACT ACTUAL value of the rotational speed of the compressor unit
nK-SETP rotational speed upper limit
nK-min determined SETPOINT rotational speed to which reduction is carried out
pK compressor unit opposing pressure
R1, R2, R3, R4, R5, R6 regulating steps
I, II first, second branch of the control loop
SR sampling rate
SS control signal
UB operating voltage
t time
T-START starting time
T1, T2, T3, T4 dwell times
PWM PWM characteristic curve
R control loop
Ueff effective voltage ramp

DETAILED DESCRIPTION OF THE PREFERRED EMBODIMENTS

FIG. 1 shows a profile of a start current characteristic without current limitation with a comparatively high current level IB-Max at approximately 80 A, which can, under certain circumstances, have disadvantageous effects on the air supply system, in particular on other components of a compressed air feed, or generally on other vehicle systems. A compressor unit, which is usually actuated by means of a compressor unit relay and driven by means of a DC brush motor, can have various disadvantages during switching on and during switching off, and, under certain circumstances, also during operation under different load conditions, as a result of its power drain.

Such disadvantages can, inter alia, also affect the electrical on-board power system of the vehicle and a fuse configuration of the compressor unit supply circuit. Even an unacceptable voltage drop over the compressor unit supply lines at the starting torque can occur as a result of the power drain and therefore affect the starting capability of the compressor. FIG. 1 illustrates an exemplary start current characteristic in this respect. Electrically driven compressor units for passenger car air suspension systems, for example, generally have a power drain of 180 W to 400 W in the case of a start current with a current level IB-Max of up to 120 A. In the case of a high start current, as illustrated in FIG. 1, a high voltage drop that reduces the starting capability of the compressor unit occurs. For the purpose of compensation, corresponding power cross sections for the compressor unit supply therefore are usually kept available. In addition, the fuse configuration must be able to cope with the start current of the compressor unit without incorrect triggering. However, it should be understood, with respect to effects on the electrical on-board power system of the vehicle, that, in the case of a weakened starter battery, the generator usually cannot compensate for the steep rise in the current by means of relays when the compressor unit is switched on. As a result, a brief undervoltage occurs in the vehicle, which can, in turn, bring about functional faults in other systems. It is advantageous to perform gallery venting before a shutdown of the compressor unit in order to reduce the operating current of the compressor unit.

If, on the other hand, a brushed DC electric motor for driving a compressor unit is shut down by means of a relay, a sudden reduction in the power demand by, for example, approximately 25 to 30 A in the case of a weakened battery gives rise to undesired influences on the on-board power system, which can bring about a brief overvoltage, which, in the worst case, can cause functional faults in other systems.

In addition, in the case of a two-stage compressor unit, the load rotational speed characteristic thereof exhibits a dependence on the rotational speed and the opposing pressure of the compressor unit. Changes in rotational speed when the compressor unit is running can give rise to acoustic anomalies. In particular, in comparison to a single-stage compressor unit, the two-stage compressor unit, with a first and second compressor stage, exhibits, in the relevant pressure range, an even more clearly pronounced rotational speed dependence, which is shown, for example, in FIG. 10 and FIG. 11. Although this dependence is also present in a single-stage compressor unit, it is not as clear as in the case of a two-stage compressor unit; therefore, a preferred application of regulation of rotational speed occurs, in particular, in the case of a two-stage compressor unit and is described below.

Figure 2:
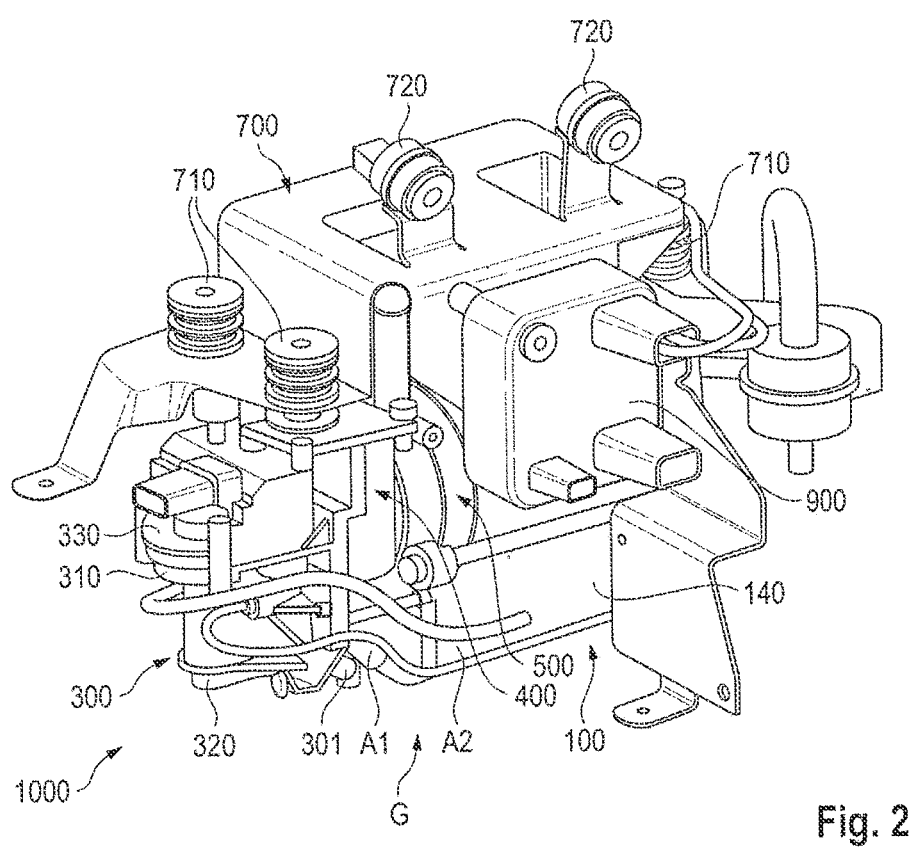
FIG. 2 is a perspective view of a compressed air supply installation (illustrated in detail in FIG. 3) according to an embodiment of the present invention.

In order to overcome the anomalies or problems explained above, the compressor unit is activated and deactivated by means of an electronic control device 900 for implementing at least one soft start (CSS—compressor soft start). Such electronics are provided in the vicinity of the compressor unit and are shown in FIG. 2 by way of example together with a compressed air supply installation. FIG. 2 shows a compressed air supply installation 1000, which is configured to supply a pneumatic system 1001 in the form of an air spring system of a passenger car. The pneumatic system 1001 is discussed further hereinafter with reference to the circuit diagram in FIG. 3. Referring to FIG. 2, and to FIG. 3, the compressed air supply installation 1000 has an electric motor 500 for driving a compressor 400, which is embodied here as a double compressor. Air that is to be compressed is fed to the compressor 400 and then fed to a pneumatic main line 200 as compressed air. An air dryer 100 with a drying container 140, which serves to dry the compressed air in a dryer bed embodied directly in chambers of the drying container 140, is likewise connected to the pneumatic main line 200.

The pneumatic main line 200 connects overall a compressed air feed 1 from the compressor 400 to a compressed air port 2 to a gallery 610 of the pneumatic system 1001 via a further pneumatic line 600. A valve arrangement 300, which is depicted in FIG. 2 after its housing, is also pneumatically connected in the pneumatic main line 200. The valve arrangement 300 has a switchable directional control valve arrangement 310 that can be connected via a control valve 320 in the form of a solenoid valve. A boost valve 330 is also integrated into the valve arrangement 300. The boost valve 330 (a 2/2 boost valve) and the control valve 320 in the form of a solenoid valve (a 3/2 solenoid directional control valve) are embodied here as a double block, i.e., as a double valve. The double valve is integrated onto the directional control valve arrangement 310 in the valve arrangement 300.

Overall, the compressed air supply installation 1000 is embodied with an electric motor 500 and a two-stage compressor 400, which can be assembled in modular fashion into one structural unit with the air dryer 100 and the valve arrangement 300 as well as the pneumatic main line 200. As shown in FIG. 2, a housing arrangement G having the electric motor 500 and the compressor 400 is provided, wherein the compressor 400 serves as a central monoblock. In particular, the compressor 400 is embodied here, advantageously, as a two-stage compressor. The air dryer 100 and the valve arrangement 300 can be attached to this housing arrangement G on opposite sides. In particular, the air dryer 100 and the valve arrangement 300 can be attached in an exchangeable fashion to the housing arrangement G. The housing arrangement G is constructed, on the one hand, with the electric motor 500, the compressor 400 and the air dryer 100 in an approximately U shape. The valve arrangement 300 is attached to the base of the U-shaped arrangement. The housing arrangement G has a connection plane A1, which faces the valve arrangement 300 and to which the valve arrangement 300 can be attached in a modular fashion. The housing arrangement G has a connection side A2, which faces the air dryer arrangement 100 and to which the air dryer arrangement 100 can be attached in a modular fashion. The connection plane A1 and the connection side A2 are spaced apart from one another by a connection distance, wherein the monoblock of the compressor 400 is for the most part accommodated in the connection distance. Owing to the modular arrangement of the abovementioned components of the air dryer 100 and of the valve arrangement 300, the functionalities of the dryer, on the one hand, and those of the compressed air control, on the other, are spatially separated. The functionalities can be configured individually according to requirements and, if appropriate, exchanged and changed separately by exchanging.

In FIG. 2, an exemplary structural implementation, the compressed air supply installation 1000 is shown in a suspension device 700, which can also be referred to as a clamp. The suspension device 700 bears the electronic control device 900, which is designed to predefine in a chronologically variable fashion for the electric motor 500 a threshold current IS that limits the operating current IB. Furthermore, the suspension device 700 has a system of spring mounts 710 for supporting the compressed air supply installation 1000 as well as spring-mounted attachment connections 720 for attachment of the suspension device 700 to a component of a vehicle.

Figure 3:
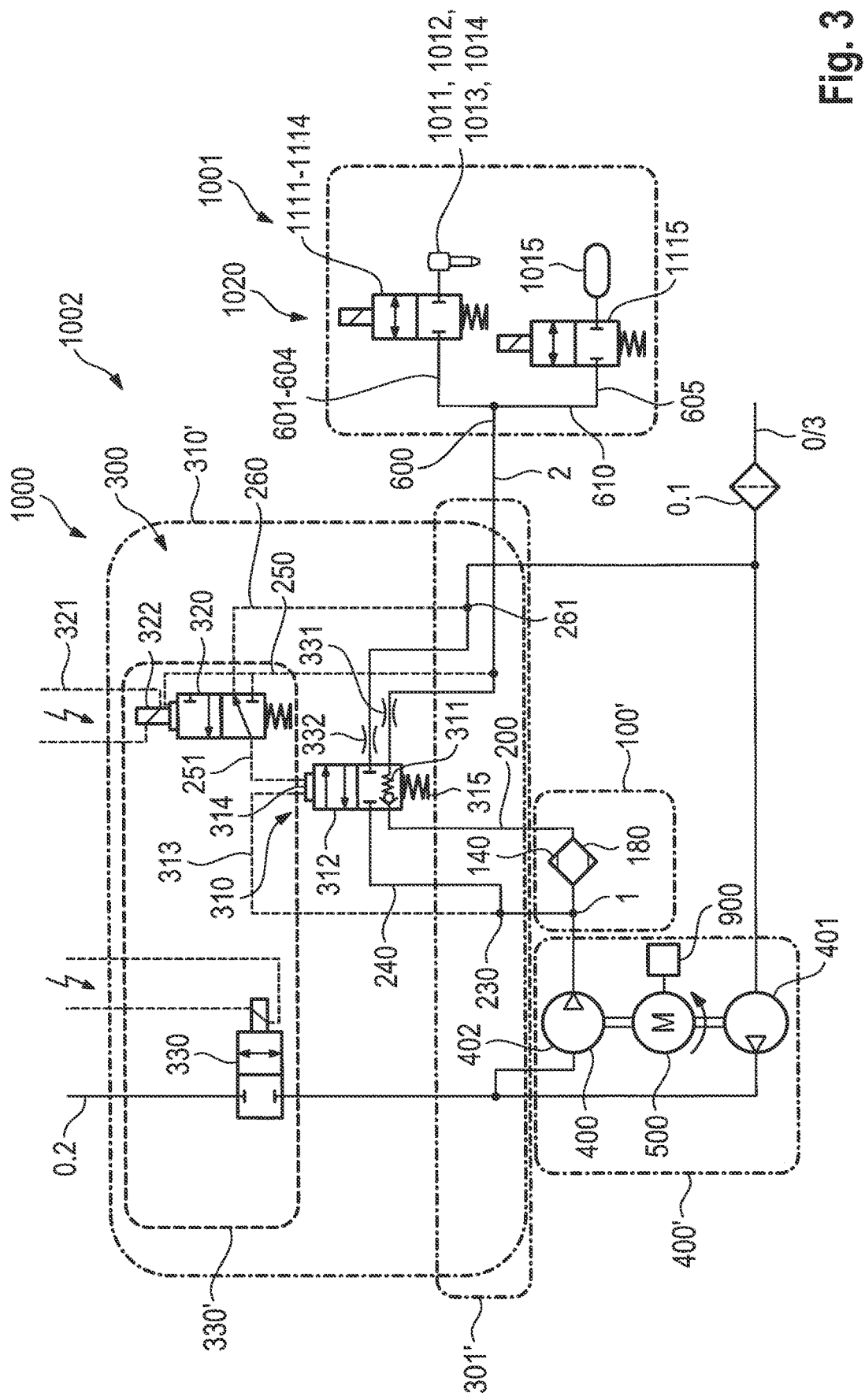
FIG. 3 is a circuit diagram of a pneumatic system including a compressed air supply installation having a compressed air feed with a compressor for producing compressed air, a brushed DC electric motor and a two-stage compressor unit according to an embodiment of the present invention.

FIG. 3 shows a pneumatic circuit diagram of a pneumatic compressed air supply system 1002 with the compressed air supply installation 1000 of the type described above and a pneumatic system 1001 in the form of an air spring system. In the circuit diagram of the compressed air supply installation 1000, the compressor 400' is also shown in a housing module, here, the specified suspension device 700 as part of the housing arrangement G, with the electric motor 500, the compressor unit 400 and the control device 900. Moreover, the dryer module 100' (of the air dryer 100), the boost valve housing module 330' (with the boost valve 330 and, here, also with the outlet valve in the form of the control valve 320) and an air distribution module 301', for example in the form of a flange 301 on a valve housing module 310' of the directional control valve arrangement 310, which can be switched by means of a control valve 320 in the form of a solenoid valve, are shown. The valve arrangement 300 which serves as a control unit can be connected comparatively easily via the flange 301 to the other modular units of the compressed air supply installation 1000, so as to be capable of being assembled in a modular fashion.

The compressed air supply installation 1000 serves to operate the pneumatic system 1001. The compressed air supply installation 1000 has, for this purpose, the abovementioned compressed air feed 1 and a compressed air port 2 connecting to the pneumatic system 1001. The compressed air feed 1 is embodied, here, with an air feed 0, a filter element 0.1, which is arranged upstream of the air feed 0, and a compressor 400, here, a double air compressor with a first compressor stage 401 and a second compressor stage 402, which is arranged downstream of the air feed 0 and driven by means of the electric motor 500, as well as a port of the compressed air feed 1, to which the air dryer 100 with the drying container 140 connect in the pneumatic main line 200.

It is possible to provide just one chamber or else a plurality of chambers of the air dryer 100; for example, a first and second chamber of the air dryer 100 can be provided for forming a first air dryer stage and a second air dryer stage in a series connection in the pneumatic main line 200. The air feed 0 and a filter element 0.1 arranged upstream thereof are combined, here, with a venting port 3.

According to the embodiment shown in FIG. 3, a branch line 230 branches off from the pneumatic main line 200 at the compressed air feed 1 and leads to a venting line 240 for a venting port 3 and the filter element 0.1 connected downstream. The pneumatic main line 200 is the single pneumatic line of the first pneumatic connection, which continues as far as the pneumatic system 1001 with a further pneumatic line 600. The pneumatic main line 200 connects the compressed air feed 1 and the compressed air port 2 pneumatically, wherein the air dryer 100, and further in the direction of the compressed air port 2 a releasable non-return valve 311 as well as a first throttle 331 are arranged in the pneumatic main line 200. The first throttle 331 is arranged between the pneumatically releasable non-return valve 311 and the compressed air port 2. A controllable venting valve 312 in a series connection to a second throttle 332 are arranged, as part of the directional control valve 310, in addition to the releasable non-return valve 311, in the venting line 240. The series arrangement composed of the first throttle 331 and the pneumatically releasable non-return valve 311 is arranged between the air dryer 100 and the compressed air port 2 connecting to the pneumatic system 1001 in the pneumatic main line 200. The rated width of the second throttle 332 is above the rated width of the first throttle 331.

Furthermore, the compressed air supply installation 1000 has the second pneumatic connection, specifically the abovementioned venting line 240, which is pneumatically connected to the pneumatic main line 200 and the venting port 3 and filter element 0.1 and/or silencer.

The venting valve 312 is embodied here as a directional control valve, which is separate from the pneumatically releasable non-return valve 311 and is arranged in the second pneumatic connection, which is embodied by means of the venting line 240. The controllable venting valve 312 is, as an indirectly switched relay valve, part of a valve arrangement 300 with the control valve 320 in the form of a 3/2-way solenoid directional control valve. The control valve 320 can be actuated with a control signal, which can be transmitted via a control line 321, in the form of a voltage signal and/or current signal to the coil 322 of the control valve 320. In the case of actuation, the control valve 320 can be transferred from the currentless position shown in FIG. 3 into a pneumatically opened, energized position, and, in this position, a control pressure is passed on via a pneumatic control line 250 composed of the pneumatic main line 200 to the pneumatic controller of the controllable venting valve 312 as a relay valve. In the currentless position, the pneumatic main line 200 is connected to the releasable non-return valve 311. The controllable venting valve 312 is additionally provided with a pressure limiter 313. The pressure limiter 313 taps a pressure via a pneumatic control line upstream of the venting valve 312, specifically between the branch line 230 and the venting valve 312, which pressure lifts off the piston 314 of the venting valve 312 from the valve seat counter to the force of an adjustable spring 315, that is, moves the controllable venting valve 312 into the opened position even without actuation by means of the control valve 320, when a threshold pressure is exceeded. This avoids a situation in which an undesirably excessively high pressure arises in the pneumatic system 1000.

The control valve 320 divides the control line 250 in the present closed state and is pneumatically connected via a further venting line 260 to the venting line 240 connecting to the venting port 3. In other words, a line section 251, lying between the directional control valve arrangement 310, in particular the venting valve 312, and the control valve 320, of the control line 250 is connected to the further venting line 260 between the control valve 320 and the venting port 3 when the control valve 320 is in the closed position shown in FIG. 3. For this purpose, the further venting line 260 connects to the further venting line 240 in the further branch port 261. The branch line 230 and the further venting line 240 lead to the venting port 3 via the branch port 261.

When there is a control pressure present at the compressed air port 2, in particular a control pressure derived from the pneumatic main line 200 or from the further pneumatic line 600 via the pneumatic control line 250, the venting valve 312 can be opened via the control valve 320 by applying pressure to the piston 314. The transfer of the control valve 320 into the open state does not only cause the venting valve 312 to open, but also causes the releasable non-return valve 311 to be released. In other words, the control valve 320 of the solenoid valve arrangement 300 serves to actuate the venting valve 312, provided separately from the non-return valve 311, as well as the non-return valve 311. This causes the air dryer 100 to open pneumatically on both sides when the control valve 320 is transferred to the opened position. This further operating position, which can be assumed by the compressed air supply installation 1000, can be used during operation to vent the pneumatic system 1001, and, at the same time, to regenerate the air dryers 100. The operating position, as shown in FIG. 3, of the compressed air supply installation 1000 serves, with the flow through the non-return valve 311 in the forward direction, to fill the pneumatic system 1001 via the pneumatic main line 200 and the further pneumatic line 600.

The pneumatic system 1001 in FIG. 3 in the form of an air spring system has, in this case, four bellows 1011, 1012, 1013, 1014, which are each assigned to a wheel of a passenger car vehicle and form an air spring of the vehicle. Furthermore, the air spring system has an accumulator 1015 for storing quickly available compressed air for the bellows 1011, 1012, 1013, 1014. Each of the bellows 1011 to 1014 has a solenoid valve 1111, 1112, 1113, 1114 arranged upstream in respective spring branch lines 601, 602, 603, 604, which proceed from a gallery 610, the solenoid valve serving, in each case, as a ride level control valve for opening or closing an air spring, which is formed with bellows 1011 to 1014. The solenoid valves 1111 to 1114 in the spring branch lines 601 to 604 are embodied as 2/2-way directional control valves. A solenoid valve 1115 in the form of a further 2/2-way directional control valve is arranged as a storage valve upstream of an accumulator 1015 in an accumulator branch line 605. The solenoid valves 1011 to 1014 are connected, by means of the spring and accumulator branch lines 601 to 604 and 605, to a common collecting line, specifically the gallery 610 denoted above and then to the further pneumatic line 600. The gallery 610 is, in this way, connected pneumatically via the pneumatic line 600 to the compressed air port 2 of the compressed air supply installation 1000. The solenoid valves 1111 to 1115 are arranged here in a valve block 1010 with five valves. The solenoid valves are shown in a currentless state in FIG. 2—in this context, the solenoid valves 1111 to 1115 are embodied as solenoid valves that are closed in the currentless state. Other modified embodiments can implement a different arrangement of the solenoid valves—fewer solenoid valves can also be used within the scope of the valve block 1010.

In order to fill the pneumatic system 1001, the solenoid valves 1111 to 1114, which are arranged upstream of the bellows 1011 to 1014, and/or the solenoid valve 1115, which is arranged upstream of the accumulator 1015, are moved into an opened position. Nevertheless, in the opened (and also closed) position of the solenoid valves 1111 to 1114 and 1115 in the pneumatic system 1001, an operating position of the pneumatic system 1001 decoupled from the compressed air supply installation 1000 is also possible owing to the non-return valve 311, which is not released here. In other words, when the non-return valve 311 is closed, the solenoid valves 1111 to 1114 can be opened and closed as desired, with the result that independent operation of the pneumatic system 1001 is possible. In particular, cross-connection of bellows 1011 to 1015 (for example, in the off-road mode of a vehicle) can be performed and filling of the bellows 1011 to 1015 from the accumulator 1015 or a pressure measurement in the pneumatic system 1001 can be carried out by means of the gallery 610 without applying pressure to the compressed air supply installation 1000. In particular, the air dryer 100 is protected against unnecessarily having compressed air applied to it, by virtue of the non-return valve 311, which is blocked by the compressed air port 2 connecting to the compressed air feed 1, and the closed control valve 320. Application of compressed air to the air dryers 100 is not advantageous in every operating position of the pneumatic system 1001. Instead, for effective and rapid regeneration of the air dryer system 100, it is advantageous if regeneration is performed exclusively in the case of venting of the pneumatic system 1001 from the compressed air port 2 to the compressed air feed 1; and, then, with the non-return valve 311 released. For this purpose, as explained above, the control valve 320 is moved into an opened switched position, with the result that both the venting valve 312 is opened and the non-return valve 311 is released. Venting of the pneumatic system 1001 can take place via the first throttle 331, the released non-return valve 311 with regeneration of the air dryers 100 and subsequently via the second throttle 332 and the opened venting valve 312 to the venting port 3. In other words, for the simultaneous released activation of the non-return valve 311 and for the opening activation of the venting valve 312, a control piston 314, which can be actuated pneumatically by the control valve 320, is provided, it being possible to implement the control piston 314 as, for example, a stepped relay piston.

Figure 4A:
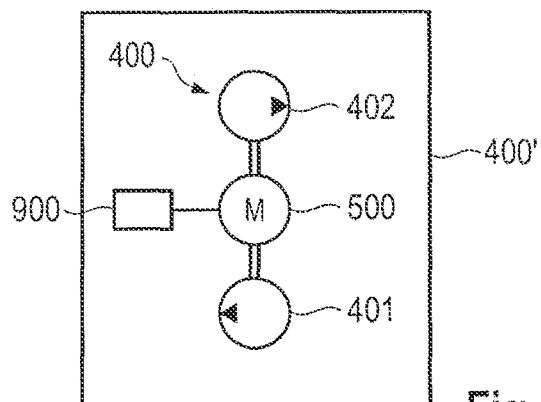
FIG. 4A shows a compressor according to an embodiment of the present invention such as provided for a compressed air supply installation of the compressed air supply installation shown in FIG. 2.
Figure 4B:
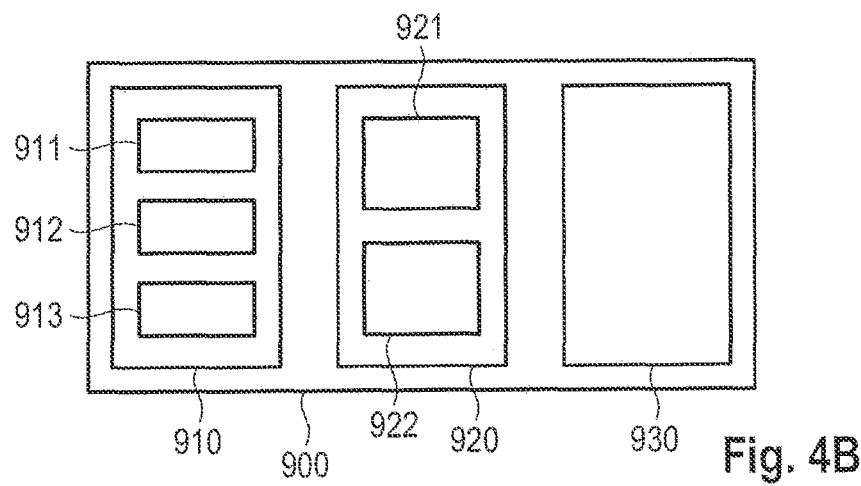
FIG. 4B is a system diagram of an embodiment of an electronic control device according to the present invention for the compressor shown in FIG. 4A, wherein the electronic control device has, inter alia, an electronic control module and a regulating module and an analysis unit.

FIG. 4A shows the two-stage compressor unit 400 with a first compressor stage 401 and a second compressor stage 402 as well as the electric motor 500 for forming a compressor 400'. As shown in FIG. 4B, the electric motor 500 is operated by means of a control device 900, which is shown in FIG. 3, and which has an electronic control module 910 with a control assembly 911 in the form of a microcontroller and a program module 912 with an executable computer program product. The program module can be stored in a memory 913 of the control module 910. Furthermore, the control device 900 has a regulating module 920 with a first regulating unit 921 for regulating an operating current and a second regulating unit 922 for regulating a rotational speed of the compressor unit motor M. The control device 900 also has an analysis unit 930, which is designed to determine an actual rotational speed nK-ACT of the compressor unit motor M or of the compressor unit 400 on the basis of a chronological profile of an operating current of the electric motor 500.

The abovementioned exemplary enumeration of units and modules of a control device 900 is not conclusive; instead, the control device 900 can have further control, regulating and analysis units that are expedient for controlling and/or regulating the compressor unit 400, in particular the compressor unit motor M. Furthermore, a grouping of modules and units, which is shown in FIG. 4B is merely exemplary and is meant to illustrate the principle of a control and regulating unit 900.

Figure 4C:
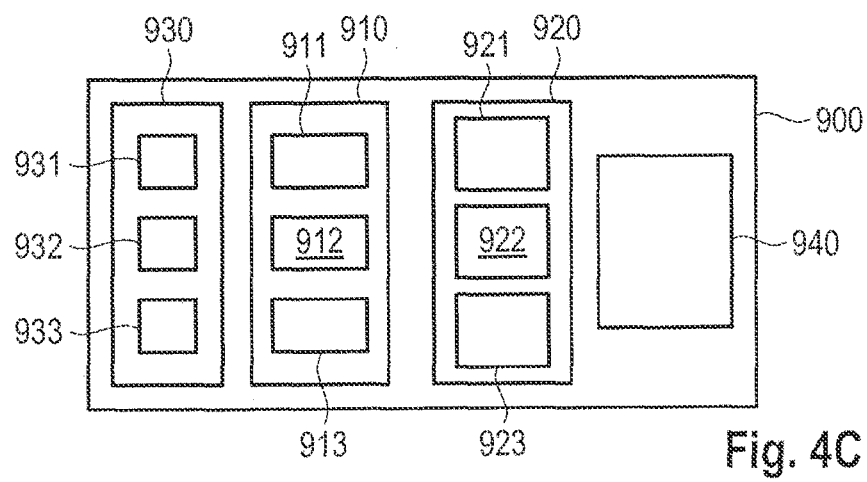
FIG. 4C is a detailed system diagram of a modified electronic control device for the compressor shown in FIG. 4A, in accordance with an embodiment of the present invention.

Another exemplary variant of a control and regulating unit 900' is shown in FIG. 4C. The latter has, like the control and regulating unit 900 in FIG. 4B, the abovementioned control module 910 with a control assembly 911, such as a microcontroller or the like, a program module 912 and a memory 913. Furthermore, a regulating module 920 of the control and regulating unit 900' provides a regulating unit 921 for the start phase of the compressor unit motor M. In particular, the regulating unit 921 is designed to regulate the start current of the operating current IB, i.e., the operating current IB in the start phase AnP. Also, the regulating module 920 has a regulating unit 922 for the load phase LaP. In particular, the regulating unit 922 is designed to regulate a rotational speed nK of the compressor unit motor M. Also, the regulating module 920 has a regulating unit 923 for a run-out phase or shutdown phase AusP of the compressor unit motor M. In particular, the regulating unit 923 is designed to regulate a shutdown current of the operating current IB, i.e., an operating current IB in the shutdown phase AusP.

Furthermore, the analysis unit 930 is configured to detect ACTUAL values of parameters of the compressor unit motor M. In particular, the analysis unit 930 has an input module 931, which is designed to implement an ACTUAL value request to the compressor unit motor M. A further input module 932 is designed to receive an ACTUAL value of the operating current IB of the compressor unit motor M. A further input module 933 is designed to receive a value of the operating voltage of the compressor unit motor M, in particular an ACTUAL value of the operating voltage UB.

Furthermore, the control and regulating unit 900' in FIG. 4C has a switching unit 940 for implementing an actuator system; the unit 940 can, for this purpose, have a suitable number of semiconductor switches. In particular, an abovementioned control assembly 911 in the form of a microcontroller and/or semiconductor switches of the actuator system can be embodied on the basis of one or more MOSFET assemblies.

Figure 5:
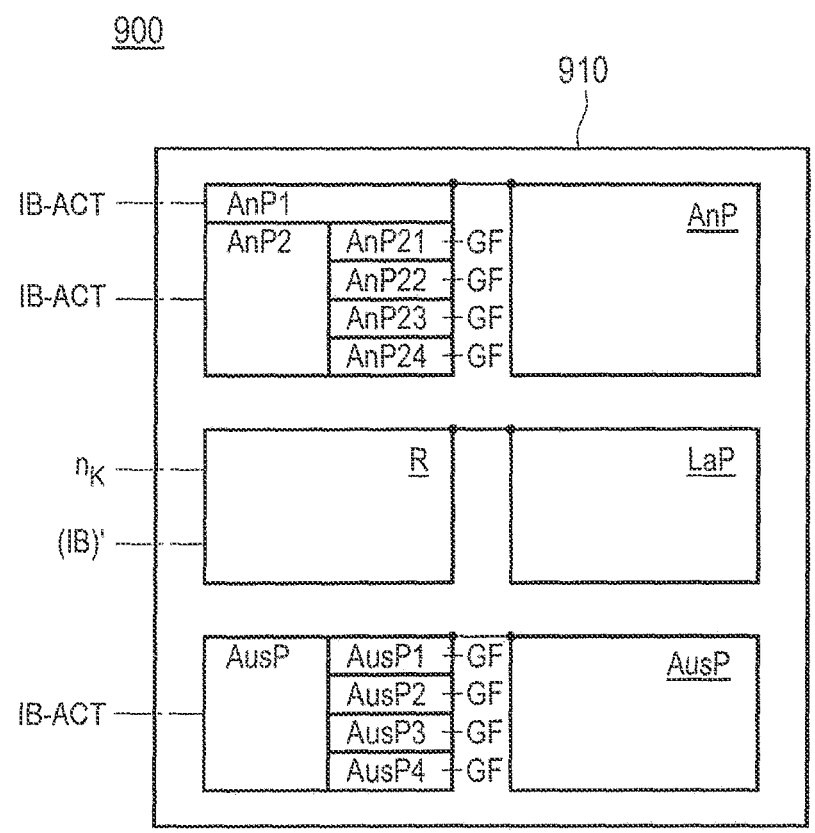
FIG. 5 is a diagram illustrating the functionality of the electronic control module shown in FIG. 4B, having a control assembly and an executable program module and a memory, in accordance with an embodiment of the present invention.
Figure 6:
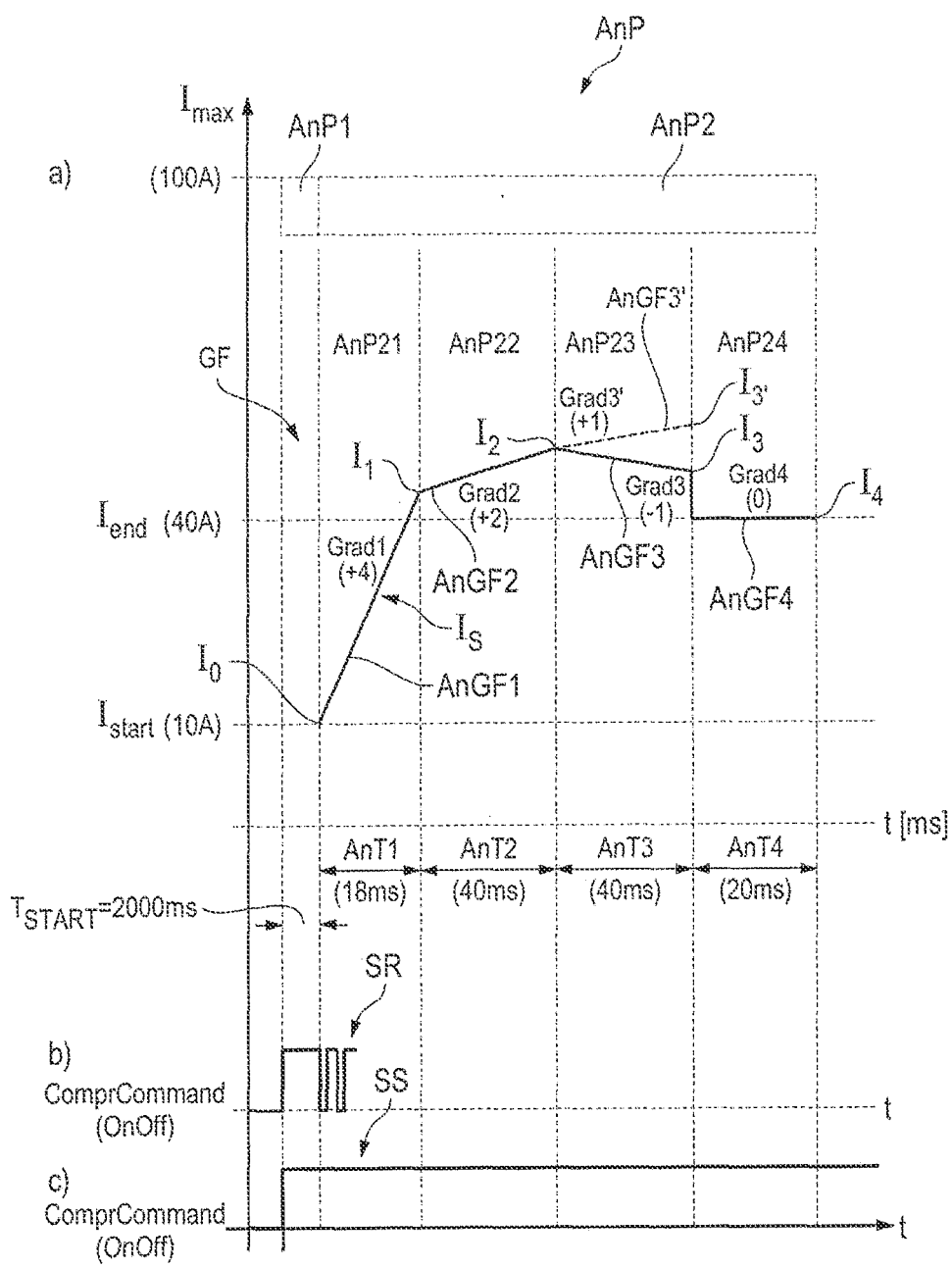
FIGS. 6a-6c illustrate a threshold current-limiting function GF of the threshold current as a function of time for a start phase AnP of the electric motor of the compressor with an exemplary number of n=4 start time periods, in accordance with an embodiment of the present invention.

FIG. 5 shows the functionality of the electronic control and/or regulating device 900, 900' in a symbolic form. The functionality of the control and/or regulating device 900, 900' is integrated essentially in the control module 910 (which combines functionalities of the control assembly 911 and the executable program module 912) and the analysis unit 930, if appropriate, with the participation of the regulating module 920. The functionality of the control device 910, as it is implemented for execution on the control assembly 911, has essentially three categories: specifically a functionality for a start phase AnP, a load phase LaP and a shutdown phase AusP. In the start phase AnP, a first functionality of the control module 910 is made available for a chronologically limited first time phase AnP1 and a chronologically limited second time phase AnP2; in the second time phase AnP2, there are four start time periods AnP21, AnP22, AnP23 and AnP24, in which different start threshold current-limiting functions GF, specifically AnGF1, AnGF2, AnGF3, AnGF4, in FIG. 6 are made available, in each case, for a start time period AnP21, AnP22, AnP23 and AnP24.

Figure 8:
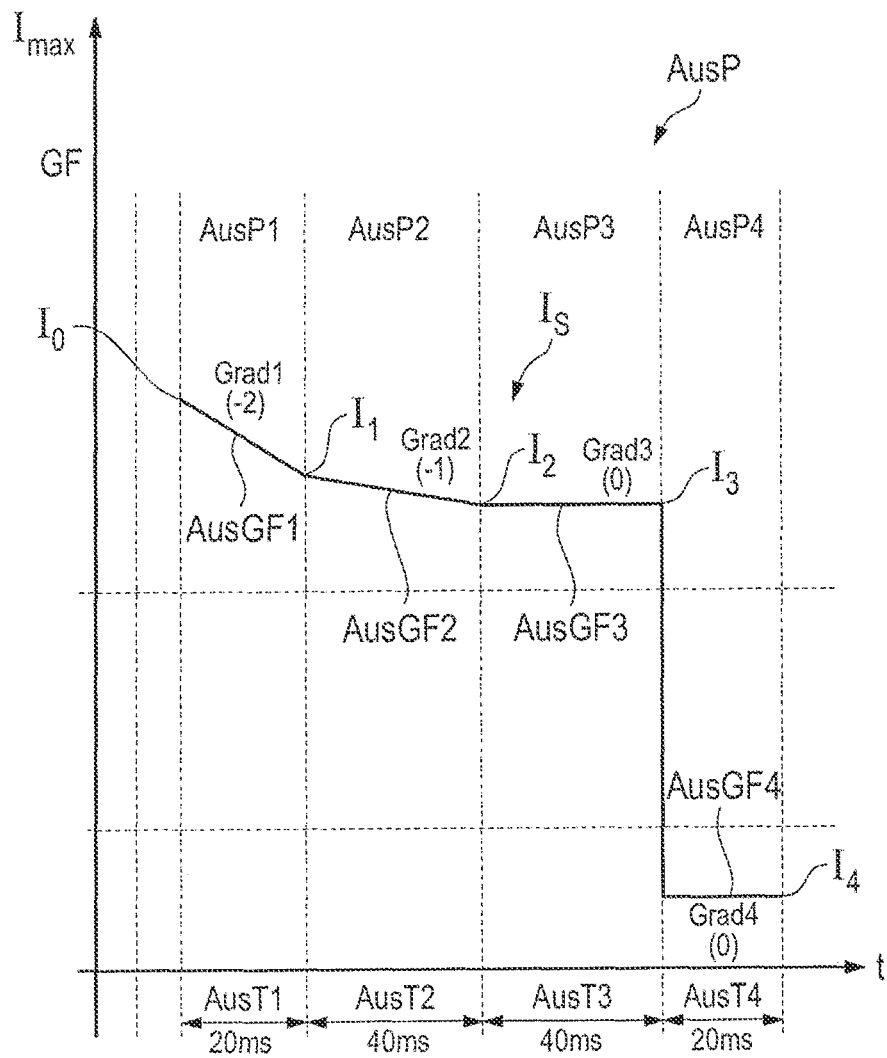
FIG. 8 shows an embodiment according to the present invention of a threshold current-limiting function GF of the threshold current as a function of time for a shutdown phase AusP of the electric motor of the compressor (compressor unit shutdown phase) and an exemplary number of n=4 shutdown time periods.

In the shutdown phase AusP, there is a functionality for a shutdown threshold current in the shutdown phase AusP by means of different shutdown limiting functions GF, specifically shutdown limiting functions AusGF1, AusGF2, AusGF3, AusGF4 in FIG. 8 for four different shutdown time periods AusP1, AusP2, AusP3, AusP4. During the start phases AnP1, AnP2 and the shutdown phase AusP, an operating current IB is made available as an ACTUAL value by means of an analysis unit 930. In each case, a threshold current-limiting function GF from the program module 912 or the memory 913 is also assigned to the respective four time periods, i.e., start time periods AnP21, AnP22, AnP23 and AnP24 and shutdown time periods AusP1, AusP2, AusP3, AusP4. These threshold current-limiting functions GF are explained hereinafter with reference to FIGS. 6a-6c to FIG. 8, in which the designations specified in FIG. 4 and FIG. 5 are adopted.

According to FIG. 6a, each of the start time periods AnP21, AnP22, AnP23, AnP24 are assigned a linear start threshold current-limiting function GF, i.e., AnGF1 to AnGF4. The start threshold current-limiting functions AnGF1, AnGF2, AnGF3 and AnGF4 can each be determined by means of a positive gradient Grad1, Grad2, Grad3, Grad4 (here, +4, +2, −1 or +1, +/−0) and a dwell time AnT1, AnT2, AnT3, AnT4 in the start time period. The total profile of a start threshold current-limiting function GF is defined over the entire second time phase AnP2 of a start phase AnP with predefinition of a starting current I-START and a final current I-END with corresponding reference points I0, I1, I2, I3 and I4, where 0=I-START and I4=I-END. It should be appreciated that the number of n=4 start time periods, which is clarified here by way of example, can be reduced or preferably increased according to requirements, in particular to a number n=5 or under start time periods AnP2$i$ ($i$=1 . . . n) with e.g., 25 ms duration each. In each case, the last start time period with the number n serves for the transition to permanent switching on. The specific profile can also be adapted as required, as is shown, for example, by the alternatives to Grad3. The entire first time phase AnP1 of a start phase AnP has no current limitation or a start threshold current-limiting function GF becomes infinite there.

According to FIG. 6b, sampling of the compressor unit operating state can take place by means of a symbolically illustrated sampling rate or a semiconductor switch clock cycle SR, in particular, a MOSFET clock cycle; this can be introduced into a corresponding sampling signal of a sampling unit. In the event of the operating current IB reaching the threshold current IS, or in the present case exceeding it, the measure according to which the operation of the compressor unit is interrupted by interrupting the operating voltage of the electric motor 500 applies. These times can be used on the basis of the control signaling to interrupt the operating voltage UB. However, any desired time can also be predefined by means of a microcontroller 911 or implemented by means of a switch. In FIG. 6C, a signal SS is indicated that requests operating parameters of the above-mentioned type at the compressor unit motor M; to be specific, a compressor unit operating current and/or a compressor unit operating voltage.

Figure 7:
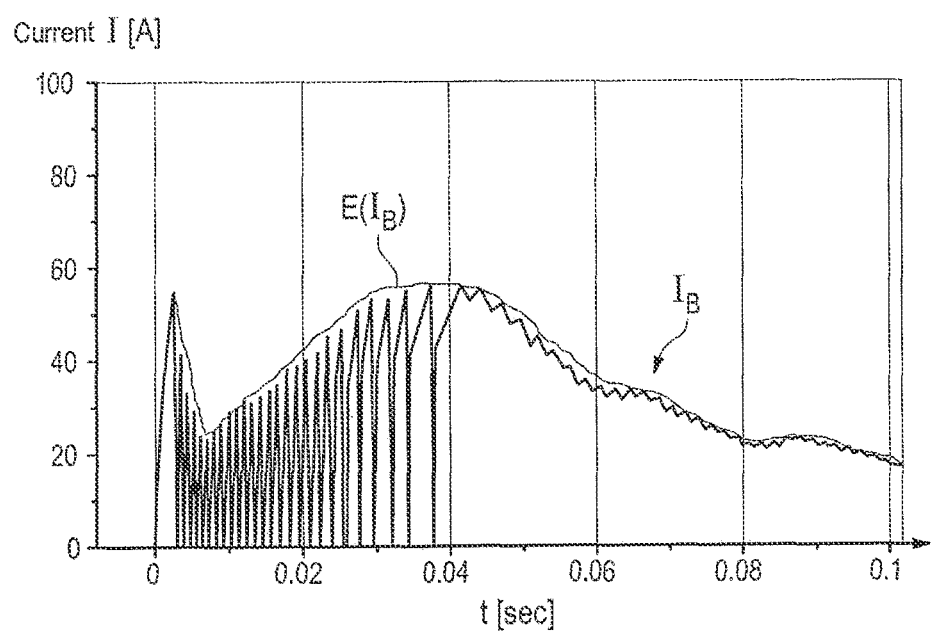
FIG. 7 shows an exemplary profile of a start current for clarifying a start current characteristic with a current limitation for an operating current of the brushed electric motor shown in FIG. 4A, in accordance with an embodiment of the present invention.

As a result, according to FIG. 7, an operating current IB is obtained as a non-continuous profile of operating current periods. An envelope E(IB), which connects the peaks of the operating current IB, is distinguished because it is below the maximum values and gradients Grad1, Grad2, Grad3, Grad4, which are predefined by the start threshold current-limiting function GF of threshold currents IS. The operating current IB of the electric motor 500 is therefore directed in a precisely targeted fashion within the scope of the method discussed above, with the result that a safe, current-limited start phase AnP of the electric motor can be implemented without power losses—this is in contrast to the operating current IB in FIG. 1.

In other words, the method discussed above for limiting the start current can also be considered a current regulating process in which the start current peak and the start current gradient are reduced such that the operating current IB remains below the envelope E(IB), which is predefined essentially by the limiting functions GF discussed above. The compressor unit starting phase under consideration, or one that is influenced by the compressor soft start (CSS), is therefore divided into a first time phase AnP1, in which no current limitation takes place, and into a second time phase AnP2, in which, as described, chronologically variable current limitation takes place. These two time phases AnP1, AnP2 can, like the second time phase AnP2, be in turn divided into a plurality of start time periods AnP2-1234, which should ensure better adaptability to the compressor unit motor.

With respect to the first time phase AnP1, it is to be noted that the critical parts of the switch-on process actually relate to the first subphases of the first time phase because, on the one hand, the compressor unit current has to already be limited in these subphases, and, on the other hand, a safe compressor unit start has to be ensured. In order to ensure a safe compressor unit start, a starting torque has to be exceeded. This starting torque is dependent on the design and the previous history of the operation of the compressor unit K, such as, for example, a pressure pK within the compressor unit feed lines, a current rotational angle of the electric motor, etc. If the starting torque is not exceeded, the compressor unit can jam even during the starting process, in particular, during a first chronologically limited time phase AnP1. In this case, the compressor unit does not even start and the electric motor then draws an unacceptably high operating current. This critical case of a jamming electric motor 500 of the compressor unit 400 can occur in the case of low supply voltages with higher probability than in the case of relatively high supply voltages. In order to prevent the compressor unit K, i.e., the electric motor 500 on the compressor unit 400 of the compressor 400', from jamming, compressor unit actuation, which is dependent on the measured supply voltage, is therefore calculated in the first time phase AnP1 and set. In the process, the first actuation phases in the chronologically limited first time phase AnP1 are provided with minimum actuation times. The minimum actuation times are set as a function of the measured voltage. A low voltage brings about, for example, relatively long minimum actuation times. Direct limitation of the compressor unit current therefore does not take place in the first time phase AnP1. Instead, indirect limitation occurs on the basis of the resulting actuation period in the chronologically limited first time phase AnP1, specifically, over the time T-START (here, 2000 μs), illustrated in FIG. 6, as the minimum control time as a function of the measured voltage.

With respect to the second time phase AnP2, the variable current limitation occurs by means of the start threshold current-limiting function GF for forming the threshold current IS. The suitable sampling rate SR in the second time phase AnP2 can be suitably set in the second time phase AnP2 in contrast to the first time phase AnP1. If in this context the currently measured compressor unit current, i.e., operating current IB, exceeds a predefined threshold current of the start threshold current-limiting function GF IS AnGF1, AnGF2, AnGF3, AnGF4, the operating voltage UB, which is present at the compressor unit, is interrupted using a semiconductor switch. After a brief shutdown time, formed in accordance with the dips in the operating current IB in FIG. 7, the operating voltage UB is switched on again, in order to interrupt it again after the next highest threshold current value IS according to the rising profile of the starting limiting functions AnGF1, AnGF2, AnGF3, AnGF4 is exceeded. The permissible operating current IB is therefore formed as a compressor unit current from a starting value IStart up to a final value IEnd according to the start threshold current-limiting function GF, which connects the reference points I0 to I4 as a line. The chronological profile of the permissible compressor unit current as the operating current IB in the second period is predefined, for example, by means of four linear ranges or four subphases with dwell times AnT1 to AnT2. After the expiry of the last subphase (here, the start time period AnP24 with the dwell time AnT4), the compressor unit start phase is exited and there is a change into the compressor unit running phase, which is referred to below as the load phase LaP. This change is independent of the measured operating current IB of the actuated clocking ratio of the sampling rate, i.e., independent of the PWM signal for the last start time period AnP24.

As is apparent from FIG. 8, a switch-off current gradient can also be reduced by a similar current regulating process. If the currently measured compressor unit current (ACTUAL value of the operating current IB-ACT) undershoots a predefined limiting value (threshold current of the operating current IS=SETPOINT value of the operating current IS-SETP), the compressor unit supply voltage is switched on again using the semiconductor switch. After a brief switch-on time, the operating voltage UB is switched off again, in order to be switched on again after the undershooting of the next lowest limiting value. The operating current IB of the compressor unit is therefore slowly reduced. In the compressor unit shutdown phase, the compressor unit current is always regulated according to this embodiment.

FIG. 8 shows the profile of a shutdown threshold current in the shutdown phase AusP, which is obtained from the total profile of the threshold current IS along four shutdown threshold current-limiting functions GF, specifically, AusGF1, AusGF2, AusGF3 and AusGF4 along the reference points I0, I1, I2, I3 and I4, where I0 corresponds to any desired starting current I-START and I4 corresponds to any desired final current I-END, and wherein again Grad1, Grad2, Grad3, Grad4 (here −2, −1, +/−0, +/−0) specify the positive gradients of the shutdown threshold current-limiting functions AusGF1, AusGF2, AusGF3 and AusGF4. The number of n=4 shutdown time periods AusP1 (i=1 . . . n), which is clarified here by way of example, can be reduced or preferably increased according to requirements, in particular to a number of e.g., n=9 or more run-out time periods with e.g., in each case 25 ms duration. In this case, the last run-out time period with the number n serves for the transition to permanent shutting down. It is important that the final current, here I4, is sufficiently low, in particular approximately zero or tends toward zero, and the starting current I0 is in a nominal range. The individual shutdown threshold current-limiting functions GF are determined by means of the dwell times AusT1 to AusT4 of the shutdown time periods AusP1 to AusP4. Therefore, without exceeding a maximum gradient or peak of an operating current the operating current IB can be kept below the threshold current IS and powered down along a ramp that is defined in a precisely targeted fashion. The actual profile of an operating current is obtained here in a way analogous to the example in FIG. 7 with an interrupted current function, the peaks of which remain below the envelope. The behavior of a shutdown operating current IB is correspondingly below the shutdown threshold current-limiting function GF in FIG. 8 with threshold currents IS.

Figure 9:
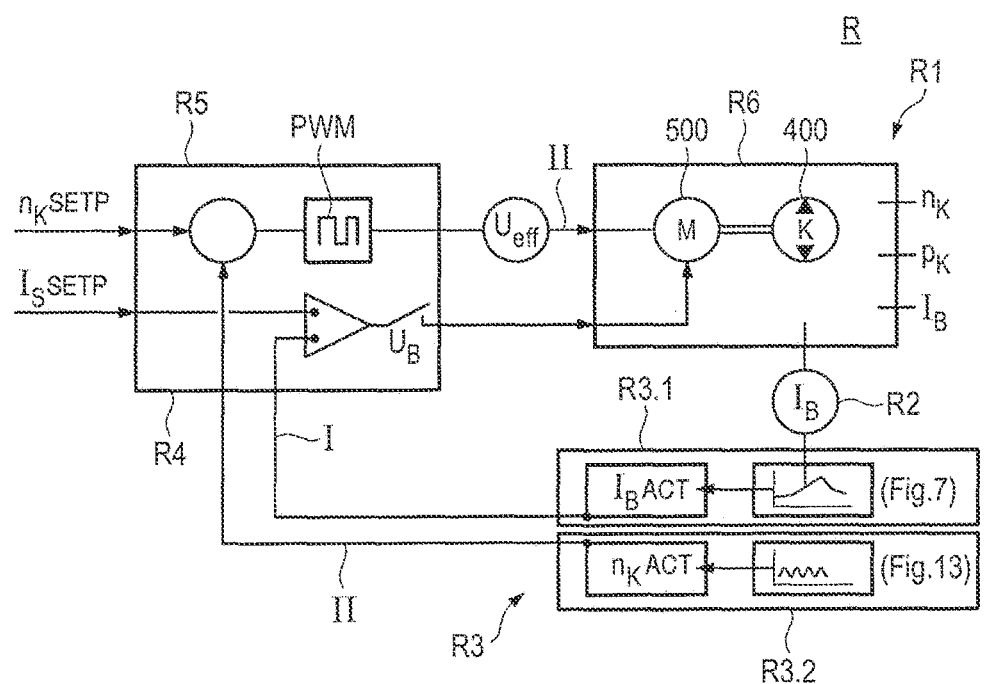
FIG. 9 is a schematic view of a closed-loop control circuit for regulating the rotational speed of a normal operating mode of an electric motor M for limiting rotational speed variability thereof as a function of the operating current, in accordance with an embodiment of the present invention.

FIG. 9 shows, for the functionality in a load phase LaP, the method of operation of a regulating module 920 for implementing a control loop R, discussed below, for the compressor unit motor M for which the abbreviation K is also selected below; specifically, a regulating unit 922 of the control and regulating unit 900 and/or 900,' which is designed to regulate a rotational speed nK of the electric motor 500, with the predefinition of a rotational speed upper limit nK-SETP, specifically, a rotational speed upper limit nK-SETP, which is constant in certain areas, as a function of the operating current IB.

Figure 13:
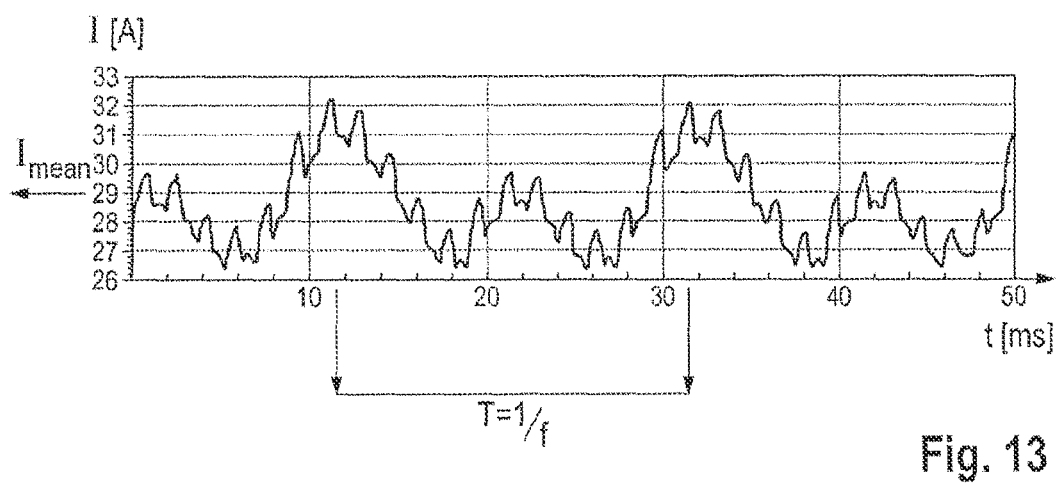
FIG. 13 shows a current profile of the brushed electric motor in the case of a running two-stage compressor unit for indirectly determining the rotational speed nK-ACT thereof from the frequency of a first order current ripple, which results from the compression and intake phases of the compressor unit (this can be used to calibrate the "non-regulated identification" by measuring the power drain and associated rotational speed in order to reduce tolerances), in accordance with an embodiment of the present invention.

According to regulating step R1 of the control loop R, during operation, the compressor with compressor unit K and electric motor M has values for the compressor unit rotational speed nK, a compressor unit opposing pressure pK and an operating current IB for the electric motor. The operating current IB is measured according to regulating step R2 of the control loop by means of the analysis unit 930 illustrated in FIG. 5. In a third regulating step R3, there are two possibilities that can be used alone or in combination. In a first possibility of a third regulating step R3.1, an ACTUAL value for the operating current IB-ACT is determined from the measured operating current IB and fed into a second branch II of the control loop. In a second possibility of a third regulating step R3.2, an ACTUAL value for a rotational speed of the compressor unit nK-ACT is determined by using a first derivation (IB)' of the operating current IB, specifically, from the frequency of the current ripple as shown in FIG. 13, and fed into a second branch II of the control loop.

In a fourth regulating step R4 of a first branch of the control loop R, the ACTUAL value of the operating current IB-ACT is fed, together with a threshold current IS as a SETPOINT value (IS-SETP), to a comparator. The latter, in turn interrupts, in accordance with the procedure discussed with reference to FIGS. 4 to 8, the operating voltage UB and/or the operating current IB or some other operating energy supply for the compressor unit motor M (or 500), embodied as an electric motor, in order to keep the actual operating current IB below the threshold current IS-SETP; different regulating mechanisms then engage as a function of the phase of the operation. In a start phase AnP, a current regulating process of the abovementioned type engages, in particular using the first possibility of a third regulating step R3.1. In a load phase LaP, a rotational speed regulating process of the second possibility of a third regulating step R3.2 engages, using the PWM in the regulating step R5. The value of the ACTUAL rotational speed nK-ACT is, in turn, subsequently used, together with a SETPOINT rotational speed nK-SETP, from the regulating step R3 in the regulating step R5 of the control loop R, in order to produce, as a function of the operating current, a signal PWM which ultimately predefines an effective voltage Ueff for the electric motor 500.

Figure 10:
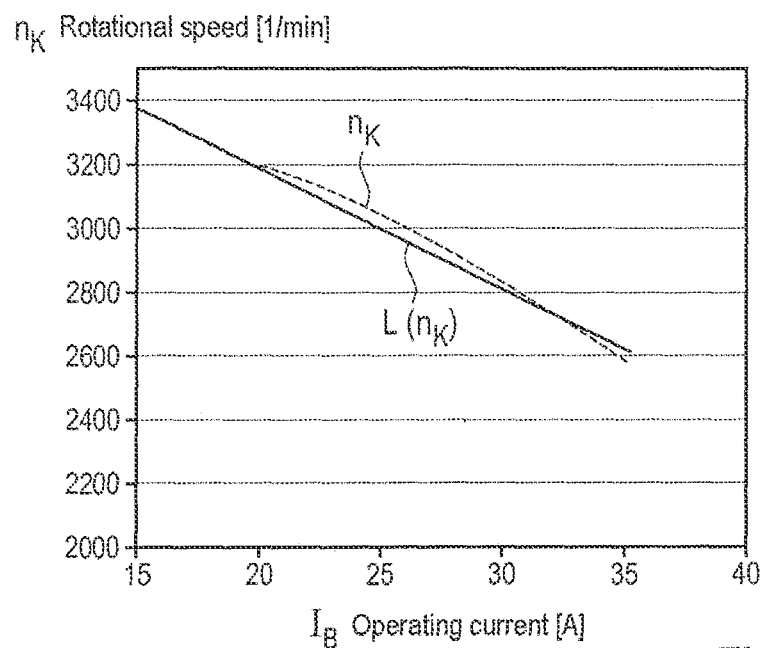
FIG. 10 illustrates a functional relationship between the power drain, that is, the operating current IB, and rotational speed nK of the electric motor M and linear adaptation L(nK) thereto, in accordance with an embodiment of the present invention.

In this respect, FIG. 10 shows the functional relationship between a power drain, filtered by low-pass filter (for example, as a sliding mean value of the real operating current), i.e., an operating current IB, on the one hand, and a rotational speed nK as a linearly falling characteristic curve for a two-stage compressor unit 400 together with a linear fit L(nK). This functional relationship of a linearly falling characteristic curve ultimately comes about owing to the functional relationship, illustrated in FIG. 11, between the power drain, i.e., here, the operating current IB, and the opposing pressure pK, which rises during a filling process during operation of the compressor unit.

Figure 12:
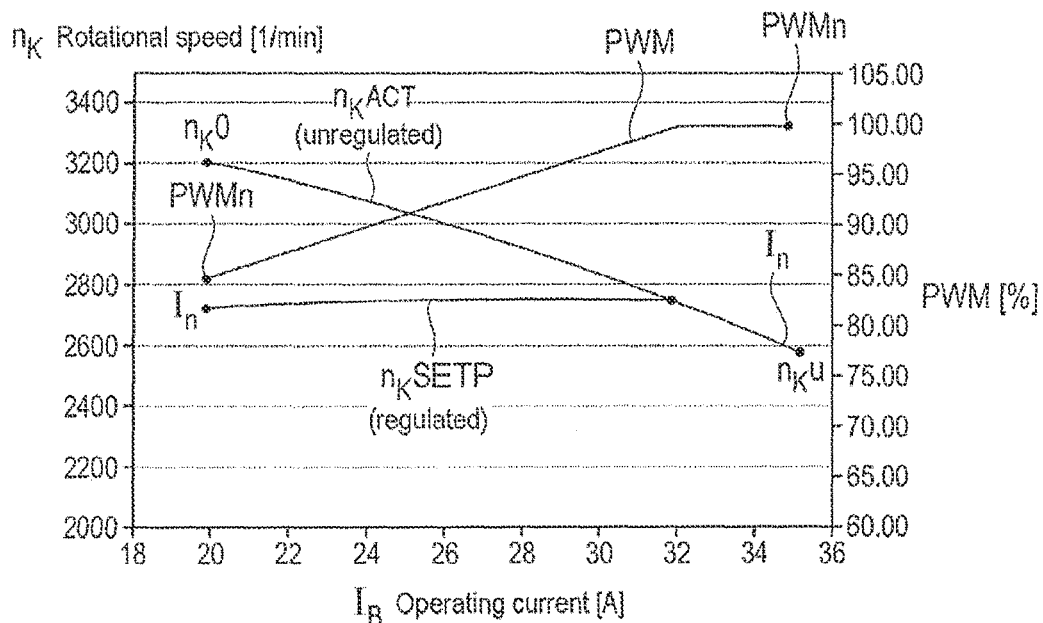
FIG. 12 illustrates the functionalities of PWM actuation (PWM) and rotational speed dependence (nK-ACT) running in opposite directions as a function of the operating current IB and the use of the functionalities, running in opposite directions, for bringing about a rotational speed (nK-SETP), which is at least approximately constant in certain areas, of the electric motor M as a function of the operating current IB specifically within the scope of regulating the rotational speed by means of PWM actuation, in accordance with an embodiment of the present invention.

FIG. 12 shows the function, illustrated in FIG. 10, of an ACTUAL value of the rotational speed nK, i.e., with its unregulated value nK-ACT, and the characteristic curve PWM, which runs in the opposite direction, i.e., the positive gradient thereof has the same absolute value but with the opposite sign, for controlling an effective operating voltage of the electric motor M. Here, the PWM value is between approximately 85% in the case of a low current (20 A) and 100% in the case of a high current (32 A).

Figure 11:
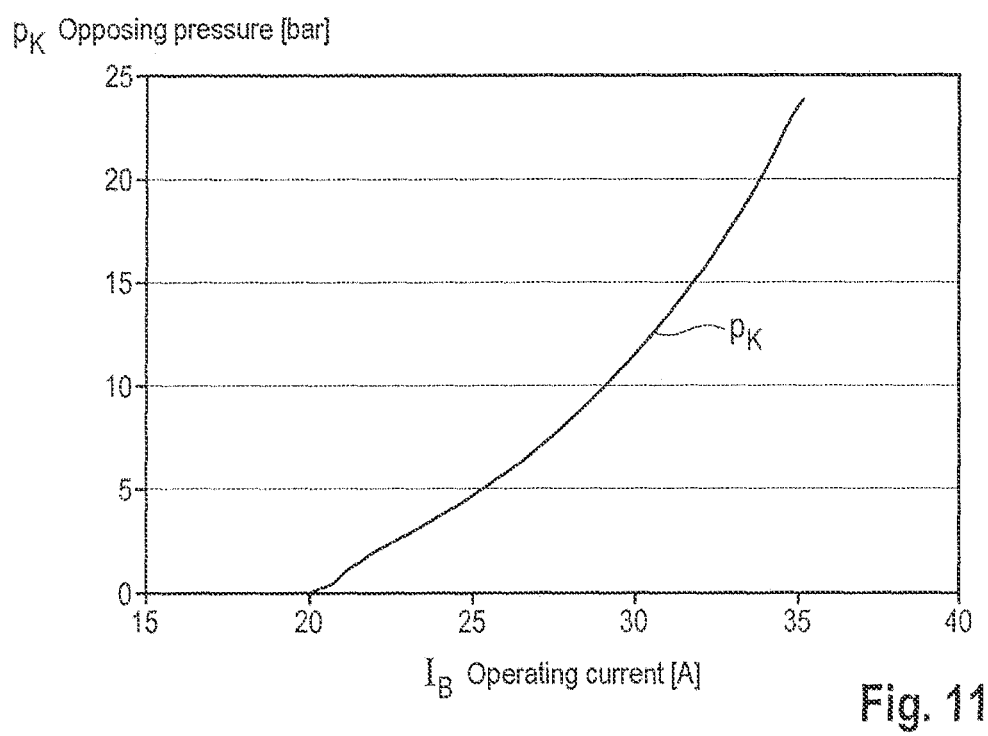
FIG. 11 illustrates a functional relationship between the power drain, that is, operating current IB, and opposing pressure pK of the electric motor M, in accordance with an embodiment of the present invention.

Owing to the dependencies illustrated in FIG. 10 and FIG. 11, a SETPOINT value nK-SETP of the rotational speed nK, i.e., here, a regulated value of a setpoint rotational speed nK-SETP, then actually occurs, which is constant over large parts of the operating current IB. In other words, the falling dependence of nK-ACT is compensated for by the rising characteristic curve PWM of the PWM signal for controlling an effective operating voltage. Overall, a rotational speed regulating process according to regulating step R6 is then obtained by means of PWM actuation along the second branch II of the control loop R starting from the regulating step R3, R5, R6.

FIG. 13 additionally also shows the calibration of the non-regulated identification by measuring the power drain and associated rotational speed in order to reduce the tolerances. In this context, the rotational speed nK is determined from the frequency of the first order current ripple, which is obtained from the compression phases and intake phases of the compressor unit. FIG. 13 shows, in this respect, the current profile when the compressor unit is running with a periodically recurring number of peaks, the frequency of which permits essentially the rotational speed of the compressor unit to be determined.

On the basis of FIG. 13, a possibility of determining the compressor unit rotational speed as a frequency f within the scope of a peak-to-peak analysis is illustrated, wherein the latter supplies a period duration T; the period duration T supplies as an inverse value the frequency f as a measure of the rotational speed nK of the compressor unit 400. Here, an example is given of a period duration of 0.019 sec, which corresponds to a frequency of 52.6 1/sec. This corresponds to a rotational speed of nK=3156 1/min. For the specified period duration T, an average current I_mean can also be determined for the operating current IB.

Furthermore, as the pressure rises, the power drain of the compressor unit rises. Owing to the relationship between the power drain and the rotational speed of a two-stage compressor unit, a drop in the rotational speed, which increases with the opposing pressure and which is not desired, occurs. In particular, when small volumes are filled, a rapid and acoustically perceptible drop in rotational speed therefore occurs. In the air spring system, this occurs, for example, at every filling of the dryer at the start of a lifting process or filling of the accumulator. By means of PWM actuation of the compressor unit, the effective supply voltage of the compressor unit can be reduced in proportion to the PWM ratio. Since the rotational speed is approximately proportional to the supply voltage, the rotational speed can therefore be reduced correspondingly. The measure of the necessary reduction in the rotational speed or the necessary reduction in the supply voltage is derived from the measured compressor unit current. In the case of a low power drain, the supply voltage and therefore the rotational speed are reduced to a defined value. The defined value corresponds to the rotational speed that would occur in the case of a relatively high load. The relatively high load can therefore be, for example, the load in the case of maximum system pressure.

The relatively high load can also be the load in the case of maximum bellows pressure. The relatively high load can also correspond to the load at any desired pressure.

The relationship between the PWM signal and the minimum rotational speed can be expressed as follows:

$$PWM = nK_{min}/(b \times IB + c),$$

where IB=operating current and where nK-min, b and c are constants (here, where nK-min=2800, b=−37.9 and c=4000).

By means of nK-min the SETPOINT rotational speed nK-SETP, to which reduction takes place, is determined.

In a modified embodiment, a modified start phase can be implemented such that, at the start of a load phase LaP and/or in the transition AnP-LaP from the start phase AnP to the load phase LaP, the system operates with a preset rotational speed regulating process, in this case, open-loop control. For this purpose, it is possible to provide that, in the case of a known rotational speed nK, a pressureless start of the compressor unit 400 is provided. On this basis, it may prove advantageous that a preset PWM ratio is used in order to achieve a constant rotational speed.

In a special case of use of a compressed air supply installation for ride level adjustment, it can be assumed that the pressure hardly changes with a corresponding spring configuration. For this case in particular, but also generally, in order to avoid relatively long operation, which, in the worst case, can result in excessive development of heat in the semiconductor switch and/or in a negative effect on the delivery volume, the compressor unit can be powered up over a chronologically adjustable ramp to 100%, with a calculated PWM ratio<100%. If this is correspondingly slowly implemented, the associated change in rotational speed is subjectively imperceptible.

For example, a value of 0.3% PWM/sec to 0.7% PWM/sec can be predefined.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A compressor for a compressed air supply installation of a vehicle, the compressor comprising:
   a brushed DC electric motor;
   a compressor configured to be driven by the electric motor; and
   a control device comprising an electronic control module configured to limit, during a start phase of the electric motor, an operating current of the electric motor to a chronologically varying threshold current in order to control the electric motor, the electronic control module comprising:
      a control assembly configured to disconnect a supply of an operating voltage to the electric motor in response to a determination that a measured value, obtained by the control device, of the operating current indicates that the operating current has reached or exceeded the chronologically varying threshold current and to reconnect the supply of the operating voltage while the electric motor has a non-zero rotational speed thereby limiting the operating current of the electric motor during the start phase of the electric motor, and
      an executable program module,
   wherein the start phase chronologically precedes a load phase of the electric motor during which the chronologically varying threshold current is not applicable.

2. The compressor as claimed in claim 1, wherein the compressor is a two-stage compressor having at least a first compressor stage and a second compressor stage.

3. The compressor as claimed in claim 1, wherein the start phase includes a plurality of start time periods,
   wherein the executable program module is configured to predefine a plurality of threshold current-limiting functions, each of which determines the chronologically varying threshold current during a respective one of the plurality of start time periods.

4. The compressor as claimed in claim 3, wherein the control device further comprises at least one of an analysis unit and an actuator system,
   wherein the at least one of the analysis unit and the actuator system of the control device is configured to determine whether the operating current reaches or exceeds the chronologically varying threshold current according to a predetermined sampling rate.

5. The compressor as claimed in claim 3, wherein the start phase is preceded by an initial time phase during which the electronic control module is configured to not limit the operating current of the electric motor, and
   wherein during the start phase, the electronic control module is configured to limit the operating current of the motor to the chronologically varying threshold current determined, for the plurality of start time periods, by the plurality of threshold current-limiting functions.

6. The compressor as claimed in claim 5, wherein the initial time phase has a starting period that is predefinable as a function of a measured operating voltage, and a duration of the initial time phase is less than a duration of each of the plurality of start time periods of the start phase.

7. The compressor as claimed in claim 5, wherein each of the plurality of threshold current-limiting functions is a linear function of time.

8. The compressor as claimed in claim 3, wherein each of the plurality of threshold current-limiting functions defines a gradient of the chronologically varying threshold current for each of the plurality of start time periods.

9. The compressor as claimed in claim 3, wherein the control assembly is configured to interrupt a supply of operating energy to the motor by the disconnecting the supply of the operating voltage to the electric motor and the reconnecting the supply of the operating voltage to the electric motor.

10. The compressor as claimed in claim 3, wherein each of the plurality of start time periods has a duration of 40 ms or less.

11. The compressor as claimed in claim 1, wherein the control device further comprises (i) a sampling unit configured to signal the measured value of the operating current of the electric motor with a predefinable sampling rate, and (ii) a comparison unit configured to compare the measured value of the operating current with the chronologically varying threshold current.

12. The compressor as claimed in claim 11, wherein the predefinable sampling rate is in a range of 100 Hz to 50,000 Hz.

13. The compressor as claimed in claim 1, wherein the electronic control module is configured to:
   control a soft start,
   not limit the operating current during a chronologically limited initial time phase preceding the start phase, and
   predefine a starting operating current for the start phase.

14. The compressor as claimed in claim 1, wherein the program module is configured to predefine a plurality of first start threshold current-limiting functions according to which the chronologically varying threshold current is determined for a plurality of first start time periods in the start phase, and wherein the program module is further configured to predefine a plurality of second start threshold current-limiting functions according to which the chronologically varying threshold current is determined for a plurality of second start time periods.

15. The compressor as claimed in claim 1, wherein the compressor is configured such that a changeover from the start phase to the load phase is effected independently of the operating current of the compressor,
   wherein the start phase has a soft start, and
   wherein in the load phase, the operating current of the compressor is not limited.

16. The compressor as claimed in claim 1, wherein the electronic control module is further configured to limit the operating current of the electric motor to a chronologically varying threshold shutdown current during a chronologically limited shutdown phase.

17. The compressor as claimed in claim 16, wherein the program module is configured to predefine a plurality of first shutdown threshold current-limiting functions according to which the chronologically varying threshold shutdown current is determined for a number of first shutdown time periods and a plurality of second shutdown threshold current-limiting functions according to which the chronologically varying threshold shutdown current is determined for a plurality of second shutdown time periods.

18. The compressor as claimed in claim 1, wherein the electronic control module includes a first regulating unit configured to regulate the operating current of the electric motor while predefining the chronologically varying threshold current as a setpoint current.

19. The compressor as claimed in claim 18, wherein the electronic control module further includes a regulating module having a second regulating unit configured to regulate a rotational speed of the electric motor during the load phase while predefining a rotational speed upper limit that is constant in at least one area as a function of one of the operating current and a variable derived from the operating current.

20. The compressor as claimed in claim 18, wherein the first regulating unit is configured to limit a rotational speed variability of the electric motor as a function of one of the operating current and a variable derived from the operating current over a PWM characteristic curve, in the form of an effective voltage ramp, stored in the program module, as a function of the operating current.

21. The compressor as claimed in claim 20, wherein the PWM characteristic curve defines a lower effective voltage corresponding to a low PWM value when a low current is present, and an upper effective voltage corresponding to a high PWM value when a high current is present, wherein the lower effective voltage is below the upper effective voltage, and the rotational speed variability of the electric motor has an upper rotational speed value when a low current is present and a lower rotational speed value when a high current is present, and wherein the upper rotational speed value is above the lower rotational speed value.

22. The compressor as claimed in claim 1, further comprising an analysis unit configured to (i) determine an actual rotational speed of the compressor from a chronological profile of the operating current, (ii) determine a frequency from a plurality of periodic peaks of a current ripple, and (iii) assign the frequency to an actual rotational speed of the compressor, the actual rotational speed being an input value for a first regulating unit of a regulating module of the electronic control device and to regulate a rotational speed of the electric motor.

23. The compressor as claimed in claim 1, wherein the control assembly is configured to disconnect the supply of the operating voltage to the electric motor with a semiconductor switch and to reconnect the supply of the operating voltage to the electric motor with the semiconductor switch.

24. The compressor as claimed in claim 23, wherein the semiconductor switch is configured to disconnect the supply of the operating voltage to the electric motor and to reconnect the supply of operating voltage to the electric motor according to a semiconductor switch clock cycle.

25. The compressor as claimed in claim 24, wherein the semiconductor switch clock cycle has a period of from 33 μs to 50 μs.

26. The compressor as claimed in claim 23, wherein the measured value of the operating current is measured, in a regulating step of a control loop, by an analyzer, and wherein a comparator makes the determination, in an additional regulating step of the control loop, that the operating current has reached or exceeded the chronologically varying threshold current.

27. A compressed air supply system for operating a pneumatic system of a vehicle, the compressed air supply system comprising:
  a brushed DC electric motor;
  a compressed air feed having a compressor configured to be driven by the motor to produce compressed air;
  a control device comprising an electronic control module configured to limit, during a start phase of the electric motor, an operating current of the electric motor to a chronologically varying threshold current in order to control the electric motor, the electronic control module comprising:
    a control assembly configured to disconnect a supply of an operating voltage to the electric motor in response to a determination that a measured value, obtained by the control device, of the operating current indicates that the operating current has reached or exceeded the chronologically varying threshold current and to reconnect the supply of the operating voltage to the electric motor while the electric motor has a non-zero rotational speed thereby limiting the operating current of the electric motor during the start phase of the electric motor, and
    an executable program module;
  a compressed air port to the pneumatic system;
  a venting port to the surroundings;
  a first pneumatic connection between the compressed air feed and the compressed air port, the pneumatic connection having an air dryer and an isolating valve; and
  a second pneumatic connection between the compressed air port and the venting port,
  wherein the start phase chronologically precedes a load phase of the electric motor during which the chronologically varying threshold current is not applicable,
  wherein the start phase includes a plurality of start time periods, and
  wherein the executable program module is configured to predefine a plurality of threshold current-limiting functions, each of which determines the chronologically varying threshold current during a respective one of the plurality of start time periods.

28. The compressed air supply system as claimed in claim 27, wherein the compressed air supply system is a component of a vehicle air spring system further including a gallery, at least one branch line connected pneumatically to the gallery, at least one of a bellows and an accumulator, and a directional control valve upstream of the at least one of the bellows and the accumulator.

29. A method for operating a brushed DC electric motor in a compressor for producing compressed air for a compressed air supply system of a vehicle, the motor being (i) configured to drive a compressor unit, and (ii) controllable by an electronic control module having a control assembly and an executable program module, the electronic control module being a component of a control device, the method comprising:
  limiting, by the control module during a start phase of the brushed DC electric motor, an operating current of the electric motor to a chronologically varying threshold current in order to control the electric motor, wherein limiting the operating current of the electric motor to the chronologically varying threshold current is performed by disconnecting a supply of an operating voltage to the electric motor in response to a determination that a measured value, obtained by the control device, of the operating current indicates that the operating current has reached or exceeded the chronologically varying threshold current and then reconnecting the supply of the operating voltage while the electric motor has a non-zero rotational speed,
  wherein the start phase chronologically precedes a load phase of the electric motor during which the chronologically varying threshold current is not applicable.

30. The method as claimed in claim 29, wherein the start phase includes at least one start time period, the method further comprising:
  predefining a threshold current-limiting function according to which the chronologically varying threshold current is determined for the least one start time period, wherein the threshold current-limiting function is a function of time,
  wherein limiting the operating current of the electric motor to the chronologically varying threshold current comprises disconnecting, by a semiconductor switch, the supply of the operating voltage to the electric motor when the operating current reaches the chronologically varying threshold current determined according to the at least one threshold current-limiting function.

* * * * *